United States Patent
Li et al.

(10) Patent No.: US 11,182,743 B2
(45) Date of Patent: Nov. 23, 2021

(54) ORDER PROCESSING METHOD AND DEVICE, SERVER, AND STORAGE MEDIUM

(71) Applicant: BEIJING GEEKPLUS TECHNOLOGY CO., LTD., Beijing (CN)

(72) Inventors: Hongbo Li, Beijing (CN); Yuanhang Liu, Beijing (CN); Jinlong Pang, Beijing (CN); Jinguo Li, Beijing (CN); Xingguo Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 55 days.

(21) Appl. No.: 16/652,216

(22) PCT Filed: May 21, 2019

(86) PCT No.: PCT/CN2019/087864
§ 371 (c)(1),
(2) Date: Mar. 30, 2020

(87) PCT Pub. No.: WO2019/223703
PCT Pub. Date: Nov. 28, 2019

(65) Prior Publication Data
US 2020/0302391 A1    Sep. 24, 2020

(30) Foreign Application Priority Data

May 21, 2018   (CN) .......................... 201810492308.0
Jun. 15, 2018   (CN) .......................... 201810620818.1
(Continued)

(51) Int. Cl.
*G06F 7/00*     (2006.01)
*G06Q 10/00*    (2012.01)
(Continued)

(52) U.S. Cl.
CPC ....... *G06Q 10/0875* (2013.01); *B65G 1/1378* (2013.01); *G05D 1/0217* (2013.01); *G06Q 30/0635* (2013.01); *G05D 2201/0216* (2013.01)

(58) Field of Classification Search
CPC .......... G06Q 10/0875; G06Q 30/0635; G06Q 30/06; G06Q 10/087; G06Q 10/0633;
(Continued)

(56) References Cited

U.S. PATENT DOCUMENTS 10,077,155 B1    9/2018  Mountz et al.
10,504,165 B1 *  12/2019 Goyal ................ G01G 19/4144
(Continued)

FOREIGN PATENT DOCUMENTS

CN    101187121 A    5/2008
CN    102733151 A    10/2012
(Continued)

OTHER PUBLICATIONS

International Search Report for PCT/CN2019/087864 dated Aug. 23, 2019 with English Translation.
(Continued)

*Primary Examiner* — Yolanda R Cumbess
(74) *Attorney, Agent, or Firm* — Arent Fox LLP

(57) ABSTRACT

The present disclosure discloses an order processing method. The method includes: receiving at least one pending order and placing the at least one pending order in an order pool; dividing part or all of pending orders in the order pool into at least one batch of task; for any of the at least one batch of task, allocating the batch of task to a corresponding target workstation, selecting a target inventory container matching an order item for a pending order in the batch of task, and selecting a target robot for carrying the target inventory container for the batch of task; controlling the
(Continued)

target robot to carry the target inventory container matching the order item to the target workstation corresponding to the batch of task. The present disclosure further discloses an order processing device, a server, and a storage medium.

25 Claims, 18 Drawing Sheets

(30) Foreign Application Priority Data

Aug. 1, 2018 (CN) .......................... 201810864364.2
Aug. 1, 2018 (CN) .......................... 201810864374.6

(51) Int. Cl.
*G06Q 10/08* (2012.01)
*B65G 1/137* (2006.01)
*G05D 1/02* (2020.01)
*G06Q 30/06* (2012.01)

(58) Field of Classification Search
CPC ....... G06Q 10/06312; G06Q 10/06316; B65G 1/1378; B65G 2201/0235; G05D 1/0217; G05D 2201/0216
USPC .......................................... 700/213–216, 223
See application file for complete search history.

(56) References Cited

U.S. PATENT DOCUMENTS

| | | | |
|---|---|---|---|
| 2008/0167884 A1* | 7/2008 | Mountz | G06Q 10/0875 705/29 |
| 2011/0062838 A1 | 3/2011 | Kim et al. | |
| 2013/0054005 A1* | 2/2013 | Stevens | G06Q 10/087 700/216 |
| 2014/0040075 A1 | 2/2014 | Perry et al. | |
| 2014/0100999 A1* | 4/2014 | Mountz | G06Q 10/087 705/28 |
| 2014/0279294 A1 | 9/2014 | Field-Darragh et al. | |
| 2014/0365258 A1* | 12/2014 | Vestal | G06Q 10/063114 705/7.15 |
| 2017/0313516 A1* | 11/2017 | Kazama | B65G 1/137 |
| 2017/0336780 A1 | 11/2017 | Wise et al. | |
| 2020/0034780 A1* | 1/2020 | Sikka | G06N 20/00 |

FOREIGN PATENT DOCUMENTS

| | | |
|---|---|---|
| CN | 105858045 A | 8/2016 |
| CN | 106897852 A | 6/2017 |
| CN | 107025533 A | 8/2017 |
| CN | 107369055 A | 11/2017 |
| CN | 107918839 A | 4/2018 |
| CN | 108846609 A | 11/2018 |
| CN | 108891838 A | 11/2018 |
| CN | 108961016 A | 12/2018 |
| CN | 109118137 A | 1/2019 |
| JP | 2001356809 A | 12/2001 |
| JP | 2008125832 | 6/2008 |
| JP | 2009518258 A | 5/2009 |
| JP | 2010051662 A | 3/2010 |
| JP | 2010246700 | 11/2010 |
| JP | 2016533999 A | 11/2016 |
| JP | 2018015252 | 2/2018 |
| WO | 2007/067868 A2 | 6/2007 |
| WO | 2015/042587 A2 | 3/2015 |

OTHER PUBLICATIONS

Office action dated May 21, 2021 from corresponding Chinese Application No. 201710616598.0.
Office Action dated Feb. 9, 2021 from corresponding Japanese Application No. 2020-504019.
First Office Action with English translation received from corresponding Chinese Application No. 201810864374.6 dated Mar. 17, 2020.
Australian Office Action dated Jul. 19, 2021 from corresponding AU Application No. 2019273336.

* cited by examiner

| Manual batch-grouping | | | |
|---|---|---|---|
| Undone: XX  Creating: XX  In sorting: XX | | | |

| Dimension 1 | Query |
| Dimension 2 | |
| Dimension 3 | Address bar  XXXX  XXXX  XXXX | Oder time XXXX XXXX |
| Dimension 4 | Order information bar  XXXX  XXXX  XXXX |
| Dimension 5 | |

Reset  Query

Query list            Mode 1 ○  Mode 2 ○   Generate batch

XXXX  XXXX  XXXX

FIG. 5

ORDER PROCESSING METHOD AND DEVICE, SERVER, AND STORAGE MEDIUM

This application is a U.S. National Stage Application, filed under 35 U.S.C. 371, of co-pending International Patent Application No. PCT/CN2019/087864, filed on May 21, 2019, which claims the priority of Chinese Patent Application No. 201810620818.1 filed on Jun. 15, 2018, the priority of Chinese Patent Application No. 201810864364.2 filed on Aug. 1, 2018, the priority of Chinese Patent Application No. 201810864374.6 filed on Aug. 1, 2018, and the priority of Chinese Patent Application No. 201810492308.0 filed on May 21, 2018, the entire contents of all of which are incorporated herein by reference in their entireties.

TECHNICAL FIELD

The present disclosure relates to the technical field of logistics and warehouse, for example, to an order processing method and device, a server, and a storage medium.

BACKGROUND

With the rapid development of E-commerce, the logistics business has increasingly become a key point, which not only brings unprecedented development opportunities for the logistics industry, but also poses a severe challenge to the logistics industry. The warehouse article picking in the traditional "person-to-goods" picking system mainly relies on manpower, which leads to the following problems: the picking efficiency is low, the error rate is high, the work intensity is high, and the labor cost is high. Compared with manual picking, the "goods-to-person" picking system in the related technology adopts the traditional automatic mode and has an improved picking efficiency. However, the "goods-to-person" picking method in the related technology still faces the problem of low picking efficiency. Therefore, how to improve the picking efficiency is still a difficult problem to be solved in the logistics field.

SUMMARY

Embodiments of the present disclosure provide an order processing method and device, a server and a storage medium to improve a picking efficiency of a picking system.

In one embodiment, the embodiment of the present disclosure provides an order processing method, including the steps described below.

At least one pending order is received, and the at least one pending order is placed in an order pool.

Part or all of pending orders in the order pool are divided into at least one batch of task.

For any of the at least one batch of task, the batch of task is allocated to a corresponding target workstation, a target inventory container matching an order item is selected for a pending order in the batch of task, and a target robot for transferring the target inventory container is selected for the batch of task.

The target robot is controlled to transfer the target inventory container matching the order item to the target workstation corresponding to the batch of task.

In one embodiment, the embodiment of the present disclosure provides an order processing method, including the steps described below.

An order set is received. The order set includes at least one first type order and at least one second type order, and each of the first type order and the second type order includes one or more order items.

Whether the order items in the first type order and the order items in the second type order overlap is determined. In response to a determination result that the order items in the first type order and the order items in the second type order overlap, one or more robots are controlled to take out the overlapping order item in the second type order and place the overlapping order item into the inventory container.

One or more robots are controlled to pick and pack the order items in the first type order from the inventory container.

In one embodiment, the embodiment of the present disclosure provides an order processing device. The device includes: a receiving module, a dividing module, an allocating and selecting module, and a robot controlling module.

The receiving module is configured to receive at least one pending order and place the at least one pending order in an order pool.

The dividing module is configured to divide part or all of pending orders in the order pool into at least one batch of task.

The allocating and selecting module is configured to allocate the batch of task to a corresponding target workstation for any of the at least one batch task, select a target inventory container matching an order item for a pending order in the batch of task, and select a target robot for transferring the target inventory container for the batch of task.

The robot controlling module is configured to control the target robot to transfer the target inventory container matching the order item to the target workstation corresponding to the batch of task.

In one embodiment, the embodiment of the present disclosure provides an order processing device. The device includes: a receiving module, a determining module, and a controlling module.

The receiving module is configured to receive an order set including at least one first type order and at least one second type order, where each of the first type order and the second type order includes one or more order items.

The determining module is configured to: determine whether the order items in the first type order and the order items in the second type order overlap, control one or more robots to take out overlapping order item in the second type order, and place the overlapping order item in the inventory container in response to a determination result that the order items in the first type order and the order items in the second type order overlap.

The controlling module is configured to control one or more robots to pick and pack the order items of the first type order from the inventory container.

In one embodiment, the embodiment of the present disclosure provides a server. The server includes:
one or more processors; and
a memory, configured to store one or more programs.

When executed by the one or more processors, the one or more programs cause the one or more processors to implement the method of any embodiment of the present disclosure.

In one embodiment, the embodiment of the present disclosure further provides a computer-readable storage medium storing computer instructions that, when executed by a processor, implement the method of any embodiment described above.

BRIEF DESCRIPTION OF THE DRAWINGS

FIG. 5 is a schematic view of an operation interface of a manual batch strategy according to embodiments of the present disclosure;

DETAILED DESCRIPTION

Figure 1:
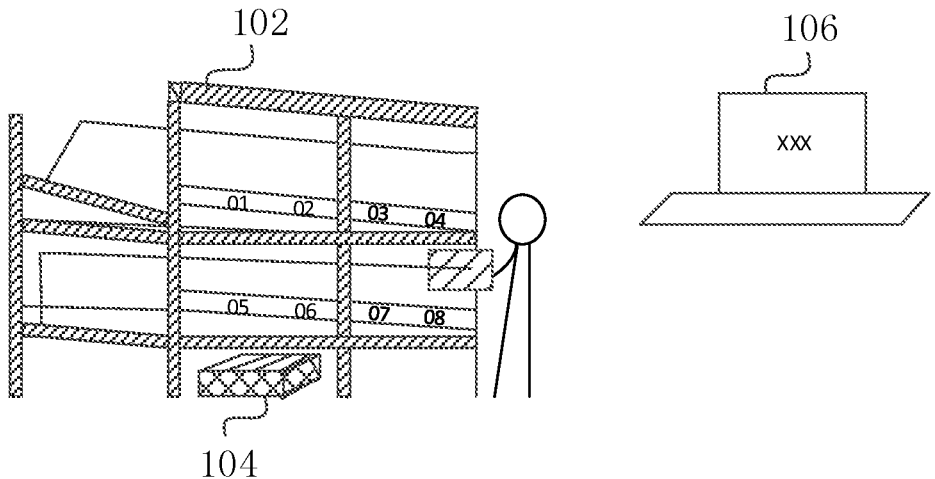
FIG. 1 is a schematic view of a picking and sorting scenario of a "goods-to-person" picking system according to embodiments of the present disclosure.

Hereinafter the present disclosure will be further described in detail in conjunction with the drawings and embodiments. It should be understood that, the specific embodiments set forth below are merely intended to illustrate and not to limit the present disclosure. For ease of description, only part, not all, of structures related to embodiments of the present disclosure are illustrated in the drawings.

Warehouse article picking in a traditional "person-to-goods" picking system relies on manpower, which has the problems of low sorting efficiency, high error rate, high work intensity, high labor cost and the like. Compared with manual picking, the "goods-to-person" picking system in the related technology adopts the traditional automatic picking method and has an improved picking efficiency. But when the order task quantity is large, the "goods-to-person" picking method in the related technology still faces the problem of low picking efficiency. Therefore, how to improve the picking efficiency is still a difficult problem to be solved in the field of logistics.

FIG. 1 is a schematic view of a picking scenario of a "goods-to-person" picking system according to embodiments of the present disclosure. As illustrate in FIG. 1, a "goods-to-person" picking system typically include a robot 104, a warehouse server 106, a sorting wall 102, or a picking container. The robot 104 may be configured to carry an inventory container (e.g., a shelf) to a workstation. The quantity of warehouse servers 106 may be more than one. The warehouse server 106 is provided with an electronic display screen. A warehouse management system (WMS) for managing orders and a robot scheduling system for scheduling robots may be integrated on one warehouse server 106 or may be integrated on different warehouse servers 106, respectively. During the picking process, the warehouse server 106 matches an inventory container according to order item (e.g., merchandise) information required in a received order task, and then schedules the robot 104 to carry the inventory container to the workstation where the picking is proceeded by a staff in a manual manner. However, in the traditional picking method, the orders are picked one by one, which leads to a low picking efficiency. Based on this, the technical solutions of embodiments of the present disclosure will be described below to solve this problem.

Embodiment One

Figure 2:
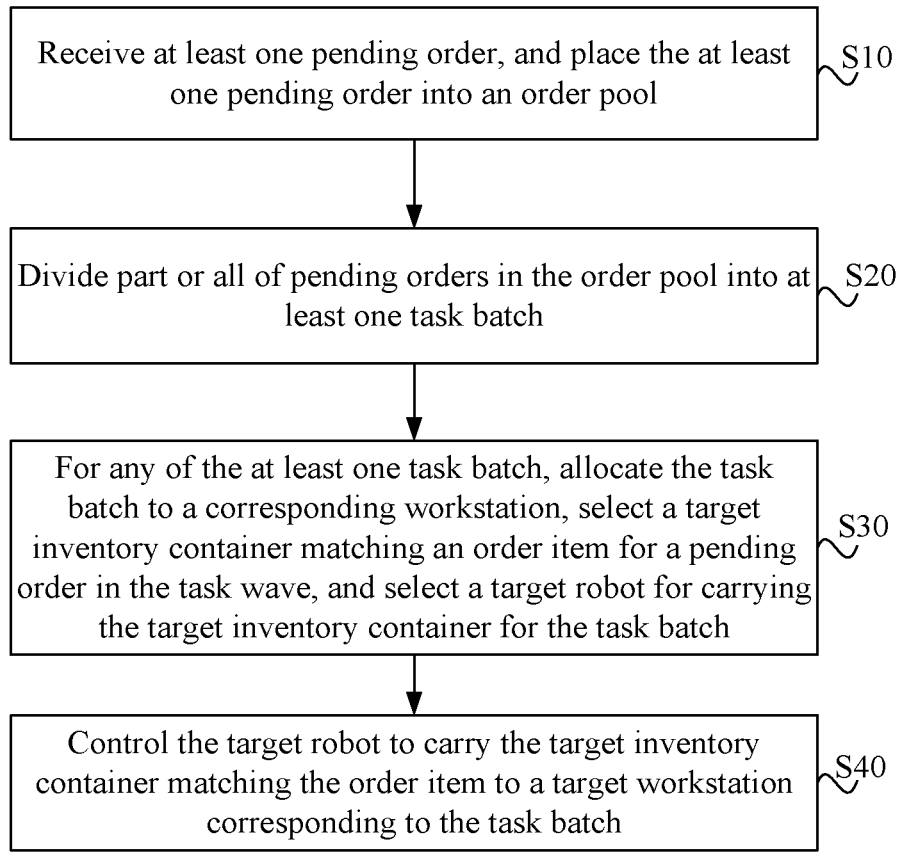
FIG. 2 is a flowchart of an order processing method according to embodiments of the present disclosure.

FIG. 2 is a flowchart of an order processing method provided in Embodiment One of the present disclosure, which can be applied to the order task picking, and can be performed by an order processing device, which can be implemented in software and/or hardware and can be integrated in a server. As shown in FIG. 2, the method includes steps S10 to S40.

In step S10, at least one pending order is received, and the at least one pending order is placed in an order pool.

In step S20, part or all of the pending orders in the order pool are divided into at least one batch of task.

In step S30, for any of the at least one batch of task, the batch of task is allocated to a corresponding target workstation, a target inventory container matching an order item is selected for a pending order in the batch of task, and a target robot for carrying the target inventory container is selected for the batch of task.

In step S40, the target robot is controlled to carry the target inventory container matching the order item to the target workstation corresponding to the batch of task.

In one embodiment, part or all of the pending orders in the order pool are divided into at least one batch of task. The division may be performed according to a division condition configured by the system, or may be performed according to a batch strategy. The division condition configured by the system may be a division condition that is beneficial to improve the order processing efficiency and obtained based on the statistical tendency of the historical order tasks. Batch strategy is a technical term in batch management. Batch management is a concept introduced to improve the picking efficiency in the logistics system. Batch management is essentially classification management of orders. When a customer's order task is sent to the warehouse, the warehouse server, such as an intelligent device like a computer, divides part or all of the pending orders in the order pool into at least one batch of task according to the preset division condition or batch strategy.

In one embodiment, dividing part or all of the pending orders in the order pool into at least one batch of task includes the following step.

Part or all of the pending orders in the order pool are combined and classified according to different dimensions to obtain at least one batch of task, where the dimensions include at least one of the following: an owner, a warehouse area, an outbound type, a shipper, cut-off time, or order priority.

Configuration based on different dimension is to combine and classify part or all of pending orders in the order pool according to different classification conditions. Each order class set corresponds to a batch of task. Multiple pending orders in each subsequent batch of task can be picked simultaneously. The matching inventory container (e.g., a shelf) may also be determined according to the order items required by multiple pending orders at the same time, instead of picking the orders one by one according to the quantity of orders in the traditional method. Therefore, the carrying times of the inventory container can be reduced, the manual picking times can be reduced, and the order processing efficiency can be improved.

Exemplarily, picking is performed according to the batch of task. Assuming that the current batch of task includes 10 pending orders, and the 10 pending orders all have demand for goods X, then the shelf where goods X is located can be found. The robot can meet the picking of goods X for the 10 pending orders by carrying the shelf once, and the staff only needs to perform the picking operation in the workstation for the current time. If the traditional picking method is used to complete the picking of goods X for 10 pending orders, the robot may need to carry the shelve for 10 times, and correspondingly, the staff will need to perform 10 picking operations.

In addition, in batch management, batch strategy refers to the principle of classifying orders according to information dimensions such as the owner, the warehouse area, the outbound type, the shipper, the cut-off time, the order priority, and the like. Batch strategy includes automatic batch strategy and manual batch strategy. The specific batch strategy content can be set in advance by the staff.

Figures 3, 4:
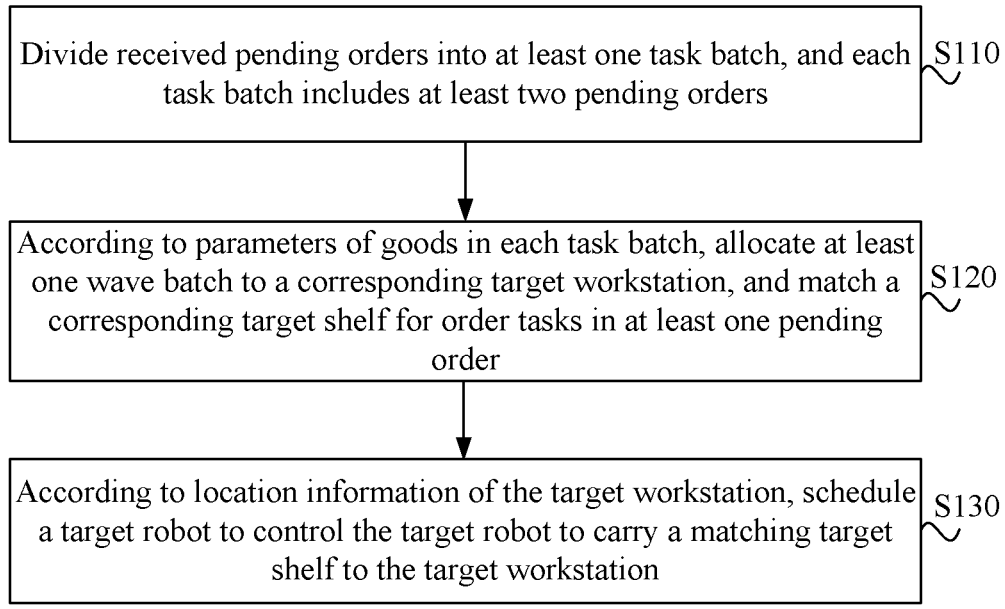
FIG. 3 is a flowchart of another order processing method according to embodiments of the present disclosure.
FIG. 4 is a schematic view of an operation interface of an automatic batch strategy according to embodiments of the present disclosure.

The automatic batch strategy is the preset strategy mode in the warehouse management system software, and the order classification dimension information includes the owner, the warehouse area, the outbound type, and the shipper. The staff can select the information according to requirements, and the warehouse management system software automatically completes the order task combination and classification. Exemplarily, as shown in FIG. 4, the staff can select dimension information on the operation interface of the automatic batch strategy. The dimensions 1 to 4 shown in the interface are the simplification of dimension information. After the appropriate dimension information is selected, the relevant batch information is further configured, and Save is clicked. Subsequently, the system can divide part or all of the pending orders in the order pool into at least one batch of task according to the strategy.

The manual batch strategy is a more personalized strategy mode. The staff can customize the order classifications dimensions, such as the owner, the warehouse area, the outbound type, the shipper, the cut-off time, and the order priority. The configuration of cut-off time allows the staff to select a certain period of time for picking the pending orders in the period of time. With the order priority, the pending order with higher order priority is preferentially processed according to the preset order priority. These two information dimensions are not available in the automatic batch strategy. Exemplarily, the operation interface of the manual batch strategy is shown in FIG. 5. The staff selects dimension information, perfects relevant batch information, and clicks the Query and Generate batch button to generate batch of task. The combination of the two strategies can make the division of batch of tasks more flexible and meet the needs of different order classification processing.

Exemplarily, a warehouse management system client is installed on the warehouse server. After a customer's sales order is received, batch construction is performed on the pending orders according to dimensions such as the owner, the outbound type, and the express company, and then the obtained batch of task is stored in the order pool of the warehouse management system. Through batch construction, a large quantity of dispersive order tasks can be classified and managed, so that a plurality of pending orders can be picked simultaneously according to the batch of task set.

As shown in FIG. 3, in one embodiment, S30 may include step S130.

In step S130, according to the parameter of the order item of the pending order in each batch of task, at least one batch of task is allocated to the corresponding target workstation, and the corresponding target inventory container is found for the order item of the pending order in the batch of task.

Through the combination and classification of the order tasks, the pending order in each batch of task includes at least one piece of common information. From these common information, the batch of task can be disbursed to the appropriate target workstations, and then the corresponding target inventory container can be found according to the parameter of the required order item. Each workstation can include a plurality of batch of tasks. Exemplarily, a warehouse management system on a warehouse server disburses the batch of tasks to corresponding target workstations according to parameters of order items in pending orders in each batch of task, such as name of the order item, manufacturer, information of the inventory container where the order item is located, the number of order items in each order, and the like. By the rational allocation of target workstations, the required inventory container in the target workstation is found, orders belonging to a same batch of task can be picked at one time, thereby solving the problem that picking orders one by one lowers the processing efficiency the problems that the remaining pending orders in the batch of task are in the consolidation and waiting state due to the picking error of a certain pending order which easily occurs in the picking process completely relying on manual work, and improving the order processing speed, ensuring the picking efficiency of pending orders and the order outbound time.

In one embodiment, S40 may include step S140.

In step S140, the target robot is scheduled at least partly according to the position information of the target workstation and the target robot is controlled to carry the target inventory container matching the order item to the target workstation corresponding to the batch of task.

After the target workstation of the batch of task is determined and the matching of the target inventory container is completed, the warehouse server can schedule the target robot to carry the inventory container. The target robot can be scheduled uniformly by the background server, or can be individually scheduled by each workstation. For example, each workstation in the warehouse may be provided with a server to share and synchronize the order data, and the staff can use the server of the current workstation to schedule the robot according to the position information of the workstation. Exemplarily, A robot scheduling system software is started on the warehouse server, according to the shelf information of the goods in the batch of tasks, the shelves are positioned, and then the navigation path is planned and sent to the target robot by combining the position of the scheduled robot and the position of the workstation, and the target robot carries the designated shelves according to the navigation path.

In one embodiment, scheduling the target robot at least partly according to the position information of the target workstation to control the target robot to carry the target inventory container matching the order item to the target workstation includes the following steps.

A robot whose navigation distance does not exceed a distance threshold is found at least partly based on the position information of the target workstation, where the navigation distance is a moving distance of the robot where the robot starts from the current position and carries the determined target inventory container to the target workstation.

A scheduling instruction is sent to the found robot, where the scheduling instruction is used for instructing the found target robot to carry the determined target inventory container to the target workstation.

The distance threshold can be configured according to the actual requirement. According to the robot scheduling algorithm, the robot scheduling system software of the warehouse server is used for determining the navigation path, and the robot which is currently in the idle state and has the shortest moving distance for carrying the inventory container is scheduled preferentially, which can reduce the navigation time of the robot for carrying the inventory container and further help to improve the picking efficiency.

According to the technical solution of the present embodiment, the received pending tasks are divided into at least one batch of task; and then according to the parameters of the order items of the pending orders in each batch of task, the at least one batch of task is disbursed to the corresponding target workstation and the required inventory container is matched; at last, the target robot is schedule to carry the required inventory container to the workstation. The technical solution solves the problem of low picking efficiency in the related technology, the processing speed of a large quantity of order tasks is improved, and the picking efficiency of order tasks in the "goods-to-person" picking system is improved. Especially, the picking process uses the processing form of batch of tasks, which plays an important role in reducing the times the robot carrying the inventory containers and the times of manual picking in the workstation. In addition, the idle robot with the shortest navigation distance is scheduled first, and the robot scheduling is optimized.

Embodiment Two

Figure 6:
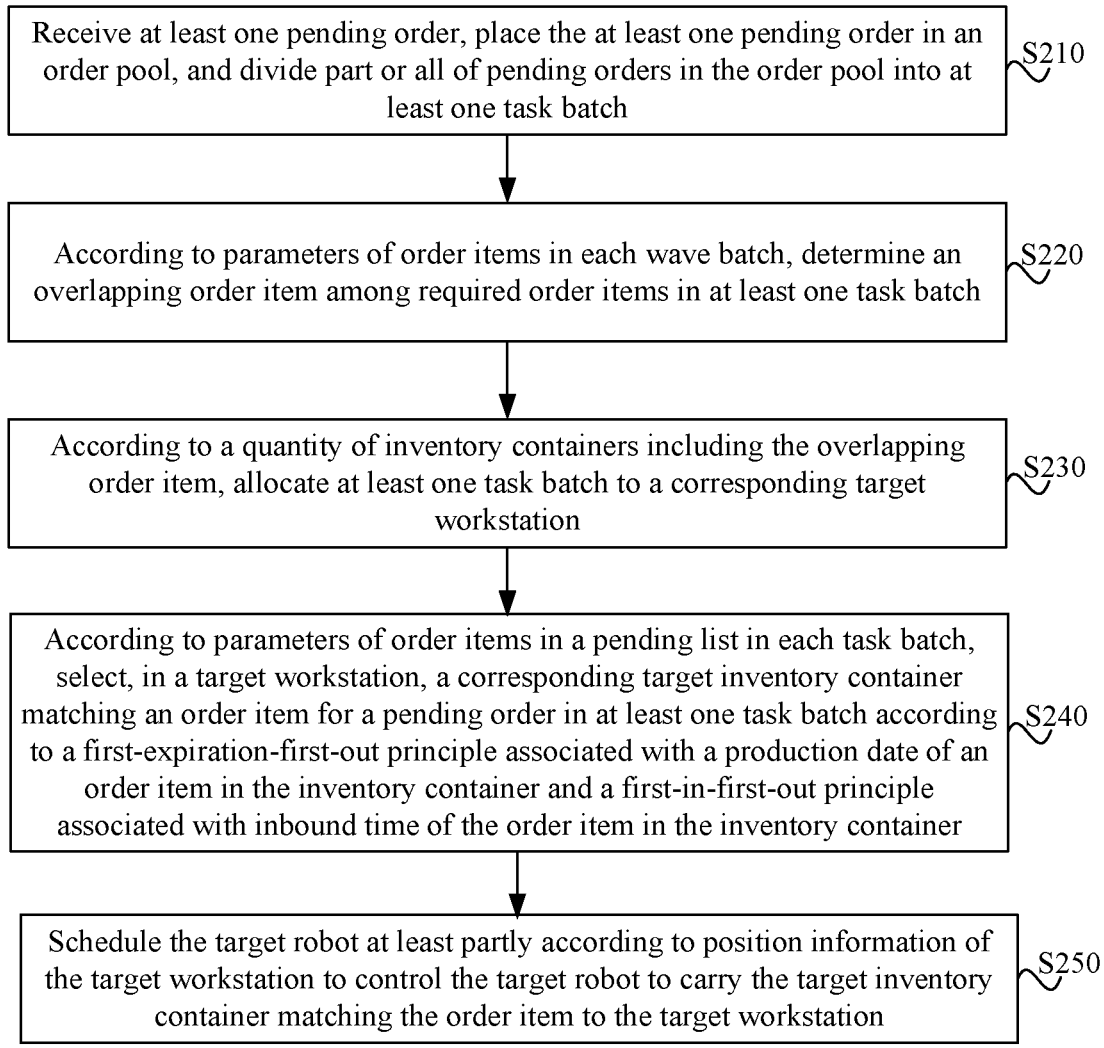
FIG. 6 is a flowchart of another order processing method according to embodiments of the present disclosure.

FIG. 6 is a flowchart of a method for processing orders provided in Embodiment Two of the present disclosure. The present embodiment is the optimization on the basis of the above embodiment. As shown in FIG. 6, the method includes steps described below.

In step S210, at least one pending order is received and placed into an order pool, and part or all of the pending orders in the order pool are divided into at least one batch of task.

In step S220, according to a parameter of an order item in each batch of task, the overlapping order item in a required order item in at least one batch of task is determined.

According to the parameters of the order items of the pending orders in the batch of task, the overlapping order item in each batch of task can be determined by statistical classification of the required order items, and the overlapping degree can be calculated, then the inventory container of the overlapping order item can be found.

In step S230, according to the quantity of inventory containers including overlapping order items, at least one batch of task is allocated to a corresponding target workstation, where the quantity of inventory containers including overlapping order items in the target workstation exceeds a first threshold.

The determination of the overlapping order item in each batch of task is to determine the overlapping degree of the order items in the batch of task. According to the overlapping degree of the order items in the batch of task, the order item in greater demand can be determined, Then, according to information of the inventory container where the overlapping order item is located, the quantity of inventory containers where the overlapping order item is located is calculated for all workstations in the warehouse, and the workstation in which the quantity of inventory containers where the overlapping order item is located exceeds the value of the first threshold order item are selected as the target workstation for this batch of task allocation. The inventory container area is a physical partition to facilitate the management of a large warehouse. The greater the quantity of inventory containers including the overlapping order item in the batch of task in the corresponding inventory container area of the workstation, the greater the success rate of centralized order picking in the batch of task of the current workstation. The first threshold can be adaptively configured according to the requirement. The order dispatching algorithm based on the principle of order item overlapping degree gives priority to the requirement of the overlapping order item, which ensures that the order item in great demand can be picked centrally in one workstation. At the same time, the more centralized the inventory container where the order item is located, the higher the efficiency of the robot carrying the inventory container.

In step S240, according to parameters of the order items of the pending list in each batch of task, the corresponding target inventory container matching the order item is selected in the target workstation for the pending order in at least one batch of task according to a first-expiration-first-out principle associated with the production date of the order item of the inventory container and a first-in-first-out principle associated with the inbound time of the order item of the inventory container.

Considering that there may be more than one inventory containers where the order item in the batch of task is located, for multiple inventory containers that meet the requirements, the order of carrying the inventory containers can be adjusted according to the production date and inbound time of the order items of the inventory containers, so that the risk of expiration and overstock of the inventory order items can be avoided.

In one embodiment, according to the parameter of the order item in each batch of task, matching a target inventory container corresponding to the order item for the pending order in at least one batch of task, includes the following step.

According to the information parameters of the order items of the pending orders in each batch of task, a target inventory container pool corresponding to the matched target workstation and a target inventory container other than the inventory container pool in the inventory container area are sequentially selected, and the quantity of the order item of the pending order in each batch of task included in the target inventory containers exceeds a second threshold, so that the robot can carry the target inventory container to the target workstation.

In the process of matching the inventory container, not only the production date of the order item in the inventory container and the inbound time of the order item, but also the quantity of the required order items included in the inventory container should be considered. In the process of matching the inventory container, the production date and inbound time of the order item are considered preferentially, or the quantity of the required order items included in the inventory container is considered preferentially.

After the batch of task is disbursed to reasonable target workstations, the warehouse server makes another statistics on the information about the order items in the pending orders in each batch of task. For example, the inventory container information of each order item is counted, the inventory container pool corresponding to the workstation and the inventory container, in which, the quantity of order items in each batch of task exceeds the second threshold, in the inventory container area other than the inventory container pool are matched as the target inventory container, so that the robot preferentially carries the target inventory container, which contains the largest quantity of required order items, to the workstation and then carries other inventory containers in which the order items are located. The inventory container pool of the target workstation is preferentially considered, because the inventory container in the inventory container pool has been matched and but has not been carried to the workstation temporarily. Matching the required inventory container in the inventory container pool again can realize both the picking of the historical order tasks and the picking of the current order tasks, and help reduce the number of times the robot carries the inventory container. The second threshold can also be adaptively configured according to the sorting requirements.

Exemplarily, at least one inventory contain is matched in a target workstation for the pending orders in each batch of task according to the parameters of the order items in each batch of task, the first-expiration-first-out principle associated with the production date of the order item in the inventory container and the first-in-first-out principle associated with the inbound time of the order item in the inventory container. Then, the target inventory container is determined according to the area classification of the matched inventory container and the quantity of order items of each batch of task included in the inventory container. The area classification of the inventory container refers to that the inventory container belongs to the inventory container pool or the inventory container other than the inventory container pool in the inventory container area corresponding to the target workstation.

In addition, each inventory container in the warehouse may include a plurality of order items at the same time, and the types of order items stored in each inventory container may be arranged according to the sales momentum of the order items, for example, the order items with higher sales volume may be placed in the same inventory container. The target inventory container in the present embodiment includes the inventory container with the largest quantity of order items required in a batch of task, and the corresponding order items may be one order item or a plurality of order items.

Compared with the related art in which inventory container is matched and carried one by one, the target inventory container is preferentially carried to the workstation, the inventory container carrying and picking for a plurality of order items of pending order requirements can be completed to the maximum extent at one time, the solution solves the following problem that in "goods-to-person" picking method in the related art, in the face of a large quantity of order tasks, it is easy for the robot to repeatedly carry the inventory containers and the picking efficiency is affected. The solution avoids the phenomenon that the inventory container is matched irrationally, and also avoids the phenomenon that the robot repeatedly carries the same inventory container for the same order item in a large quantity of pending orders, thereby greatly reducing the total number of times the robot carries the inventory container. When the number of times of the robot carrying the inventory containers decreases, the quantity of manual picking also decreases, thus improving the overall picking efficiency of the picking system.

Exemplarily, a batch of task at the workstation includes 10 pending orders. The overlapping degree of goods A in these 10 pending orders is high, The total quantity of the goods A required in the 10 pending orders is 30. The second threshold may be configured to be 25. The warehouse server determines, from the shelf pool corresponding to the target workstation and the shelves in the shelf area other than the shelf pool, a shelf where the quantity of the goods A exceeds 25 as the target shelf. If the quantity of target shelf is more than one, the robot is preferentially scheduled to carry the shelf S11 including the largest quantity of goods A to the workstation. If the quantity of the goods A included in the shelf S11 is greater than or equal to 30, it does not need to carry other target shelf again. If the quantity of the goods A included in the shelf S11 is less than 30, it needs to carry other target shelves in the order of the quantity of the goods A included in the target shelves from large to small until the quantity of the goods A in the carried shelves meets the requirement. In the above embodiment, the quantity of times the robot carrying the shelf is much less than 10. However, according to the relevant technical methods, if 10 pending orders all include goods A, the robot needs to perform shelf transport for at least 10 times, which seriously affects the picking efficiency of the pending orders.

Optionally, the target shelf is a shelf on which the total quantity of the goods C, D, and E in the above-described batch of task exceeds 25, and then the target shelf is sequentially carried in the order of the total quantity of the goods C, D, and E from large to small.

In step S250, the target robot is scheduled at least partly according to the position information of the target workstation to control the target robot to carry the target inventory container matching the order item to the target workstation.

Figure 7:
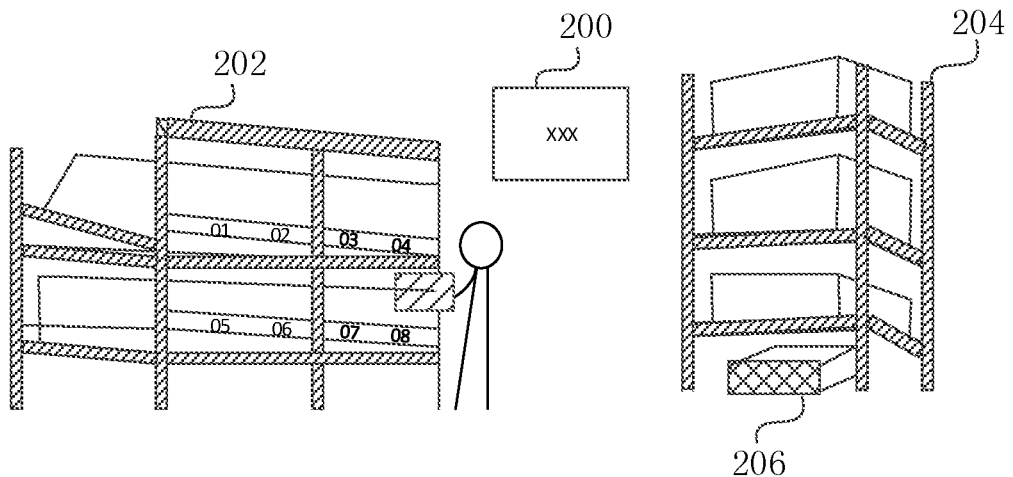
FIG. 7 is a schematic view of a picking scenario of a staff in a target workstation according to embodiments of the present disclosure.

After the robot carries the target inventory container to the target workstation, the manual picking is performed for the batch of task according to the "picking while sorting" mode and the "picking before sorting" mode. Exemplarily, when the manual picking of the batch of task is performed in the "picking while sorting" mode, the workstation is bound with the moving sorting wall. When the manual picking is performed, the required order items are placed in a specific moving sorting wall cell according to the electronic tag prompt, where the moving sorting wall binds specifications thereof in advance according to the quantity of pending orders in the batch of task. When the batch of task bound with the moving sorting wall is completed, the robot carries the moving sorting wall to the quality control and packing station. For the manual picking of batch of task in the "picking before sorting" mode, the workstation is bound with the container, and all the order items required in the batch of task are picked into the current container according to the electronic tag prompts during manual picking. When the batch of task of the binding container is completed, the robot carries the container to the secondary picking station for secondary picking operation. As shown in FIG. 7, a schematic view of a picking scenario of a staff in a target workstation is shown, the staff performs picking on the fixed sorting wall 202 and the moving sorting wall 204, respectively according to the prompt of the display screen 200, and the robot 206 may also be configured to move the moving sorting wall 204 away from the current workstation.

In addition, the robot carries the inventory container to the workstation, and the staff performs picking actions. If the inventory container corresponds to a plurality of picking tasks, the staff repeats the picking actions in the "picking while sorting" mode or the "picking before sorting" mode until all the picking tasks corresponding to the inventory container are completed.

In conjunction with a radio frequency (RF) picking+ picking to light (PTL) disbursing mode or a radio frequency picking+moving sorting wall mode is adopted, a "goods-to-person" robot picking system adopts the form of "warehouse management system+workstation (electronic tag)+robot scheduling system", the staff only needs to wait on the workstation for the inventory containers of the order items to complete the picking compared with the traditional "person-to-goods" picking system in which the batch of task is divided according to the warehouse area, which solves the problems of high labor cost and high picking error rate in the related technology, saves labor cost, and improves picking accuracy. The problem of poor picking flexibility and portability, which is caused by completely relying on manual order item picking, is solved by flexible carrying of inventory containers by scheduling robot. Moreover, compared with the mode of "radio frequency picking+moving sorting wall", the method of the present embodiment reduces the backlog pressure without increasing the picking complexity. In addition, the method of the present embodiment is not constrained by the picking device, thus the process of order tasks at any time is not affected. The solution solves the problems that the radio frequency picking in the related technology cannot adapt to the fluctuation of the warehouse orders in one or more periods due to the restriction of the equipment utilization rate, and the order item secondary distribution is not timely, thus affecting the order outbound time limit.

In the technical solution of the present embodiment, the received at least one pending order is divided into at least one batch of task, and then based on the parameters of the order items in each batch of task, the overlapping order item required in the batch of tasks is counted. According to the quantity of inventory containers including overlapping order item in the inventory container area corresponding to the workstation, the target workstation is determined. At last, according to the production date and inbound time of the order item in the inventory container, the inventory container is matched based on a "first-expiration-first-out, first-in-first-out" principle. The solution solves the problem of low picking efficiency in the related arts, improves the speed of processing a large quantity of orders, reduces the times the robot carrying the inventory containers, and reduces the times of manual picking in the workstation, thereby improving the picking efficiency of the pending orders in the "goods-to-person" picking system.

Embodiment Three

Figure 8:
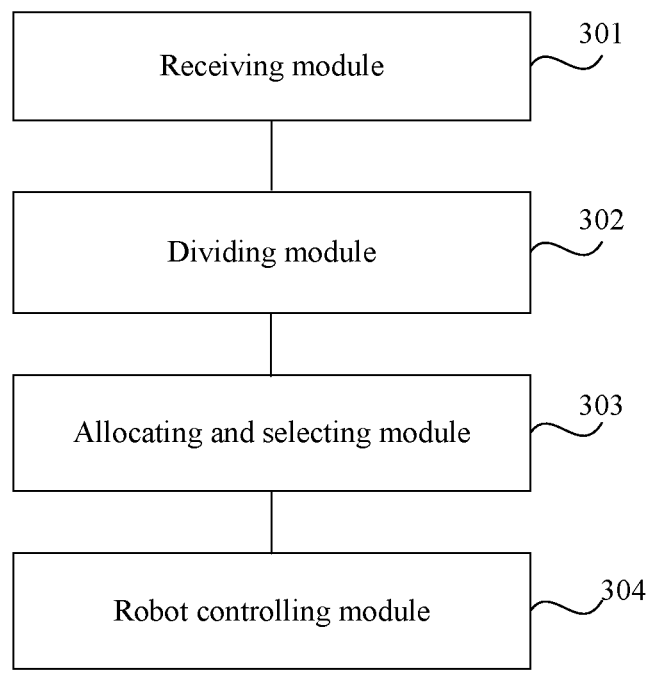
FIG. 8 is a structural view of an order processing device according to embodiments of the present disclosure.

FIG. 8 is a structural view of an order processing device provided in Embodiment Three of the present disclosure, which is applicable to the case of order picking. The order processing device according to embodiments of the present disclosure can execute the order processing methods according to any embodiment of the present disclosure, and has functional modules and effects corresponding to the execution methods. As shown in FIG. 8, the device includes: a receiving module 301, a dividing module 302, an allocating and selecting module 303, and a robot controlling module 304.

The receiving module 301 is configured to receive at least one pending order and place the at least one pending order in an order pool.

The dividing module 302 is configured to divide part or all of the pending orders in the order pool into at least one batch of task.

The allocating and selecting module 303 is configured to allocate the batch of task to a corresponding target workstation for any of the at least one batch of task, select a target inventory container matching an order item for a pending order in the batch of task, and select a target robot for carrying the target inventory container for the batch of task.

The robot controlling module 304 is configured to control the target robot to carry the target inventory container matching the order item to the target workstation corresponding to the batch of task.

Figure 9:
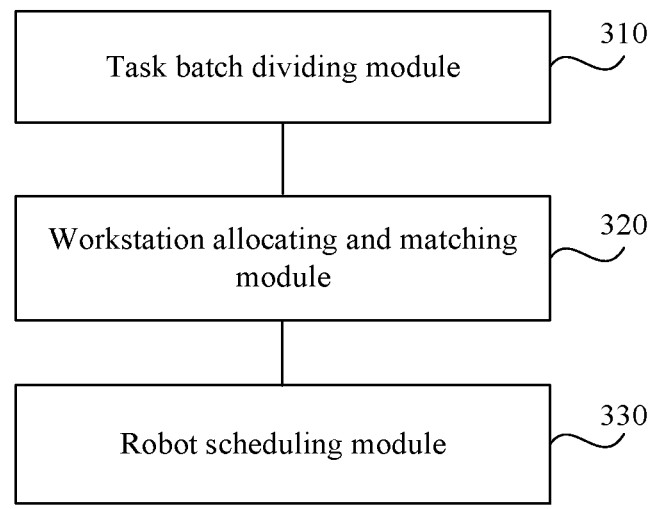
FIG. 9 is a structural view of another order processing device according to embodiments of the present disclosure.

In one embodiment, the embodiment of the present disclosure provides an order processing device. As shown in FIG. 9, the device includes: a batch of task dividing module 310, a workstation allocating and matching module 320, and a robot scheduling module 330.

The batch of task dividing module 310 is configured to receive at least one pending order, and place the at least one pending order into an order pool; divide part or all of the pending orders in the order pool into at least one batch of task.

In one embodiment, the batch of task dividing module 310 is configured to:

combine and classify part or all of the pending orders in the received order pool according to different dimensions to obtain at least one batch of task. In one embodiment, the dimensions involved in the batch of task dividing module 310 include at least one of: an owner, a warehouse area, an outbound type, a shipper, cut-off time, or order priority.

The workstation allocation and matching module 320 is configured to allocate the at least one batch of task to a corresponding target workstation according to parameters of order items in each batch of task, and hit a corresponding target inventory container for a pending order in the at least one batch of task.

In one embodiment, the workstation allocation and matching module 320 includes: an overlapping order item determining unit, a workstation allocating unit, and an inventory container matching unit.

The overlapping order item determining unit is configured to determine an overlapping order item in required order items in at least one batch of task according to parameters of the order items in each batch of task;

The workstation allocating unit is configured to allocate at least one batch of task to a corresponding target workstation according to the quantity of inventory containers including the overlapping order item. The target workstation is a workstation in the corresponding inventory container area, where in the target workstation, the quantity of inventory containers including the overlapping order item exceeds a first threshold.

The inventory container matching unit is configured to match a corresponding target inventory container in a target workstation for a pending order in at least one batch of task according to parameters of order items in each batch of task.

The robot scheduling module 330 is configured to schedule the target robot at least partly according to the position information of the target workstation to control the target robot to carry the target inventory container matching the order item to the target workstation.

In one embodiment, the robot scheduling module 330 includes: a searching unit, and a scheduling instruction sending unit.

The searching unit is configured to find a target robot whose navigation distance does not exceed a distance threshold value at least partly according to the position information of the target workstation. The navigation distance is a moving distance of the target robot, the target robot starting from its current position and carrying the target inventory container matching the order item to the target workstation.

The scheduling instruction sending unit is configured to send a scheduling instruction to the found target robot. The scheduling instruction is used for instructing the found target robot to carry the target inventory container matching the order item to the target workstation.

In one embodiment, the workstation allocating and matching module 320 is configured to allocate, according to the parameters of the order items in the pending orders in each batch of task, at least one batch of task to a corresponding target workstation, and match the target inventory containers corresponding to pending orders in at least one batch of task in a target workstation according to a first-expiration-first-out principle associated with the production date of the order item in the inventory container and a first-in-first-out principle associated with the inbound time of the order item in the inventory container.

In one embodiment, the workstation allocating and matching module 320 is further configured to sequentially match, according to parameters of the order items in the pending orders in each batch of task, a target inventory container pool corresponding to the target workstation and a target inventory container other than the inventory container pool in the inventory container area, and take the inventory container with the quantity of order items in each batch of task exceeding a second threshold as the target inventory container, so that the robot can carry the target inventory container to the target workstation.

In the technical solution of the present embodiment, the received at least one order task is divided into at least one batch of task, and then, based on parameters of the order items in each batch of task, at least one batch of task is allocated to a corresponding target workstation and a required inventory container is matched. Finally, the scheduling robot carries the required inventory containers to the target workstation. The problem of low picking efficiency in the related arts is solved, the processing speed of a large quantity of pending orders is improved, and the picking efficiency of the pending orders in the "goods-to-person" picking system is improved.

Embodiment Four

Figure 10A:
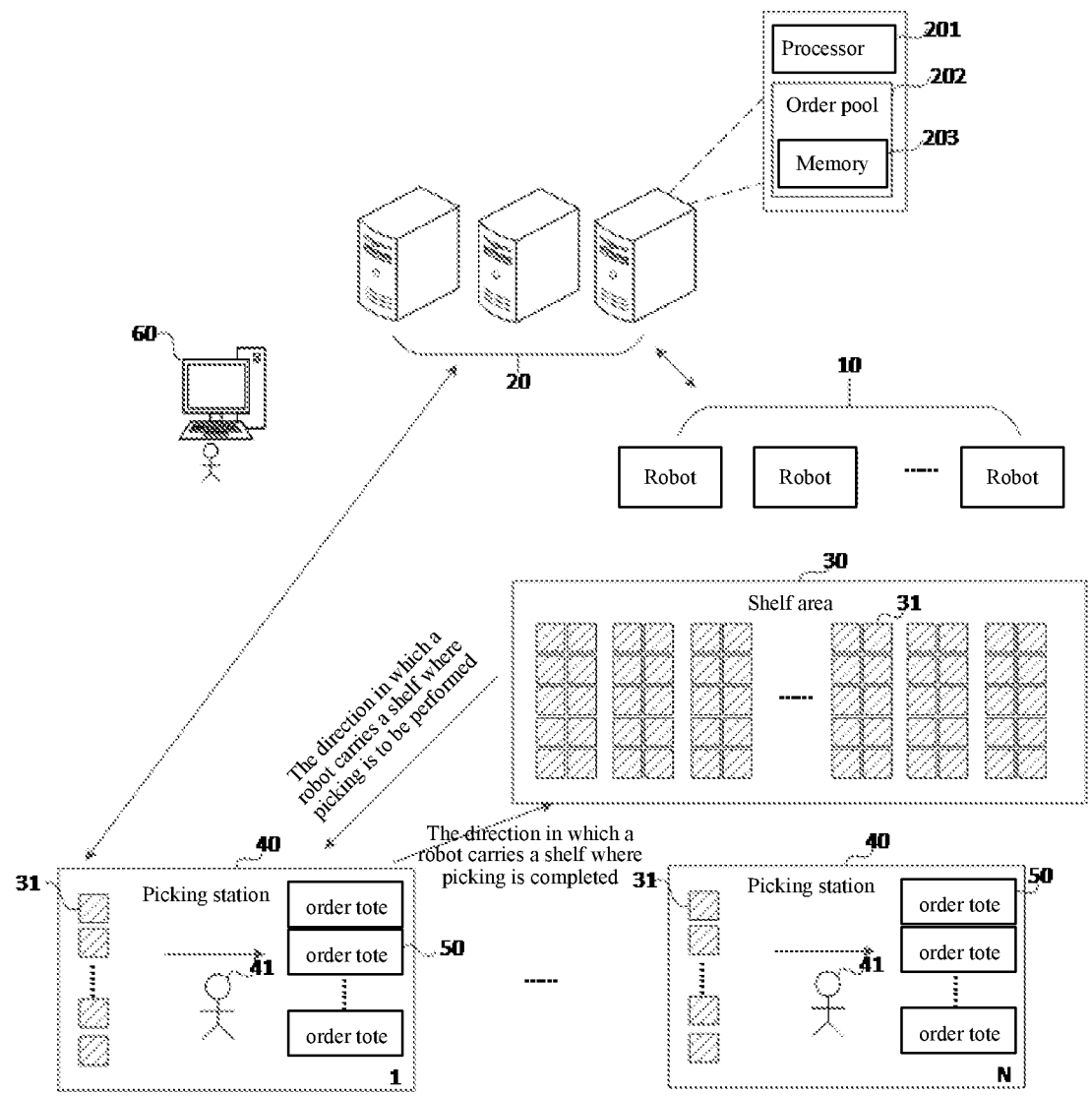
FIG. 10A is a structural view of a goods picking system to which embodiments of the present disclosure are applicable.

FIG. 10A is a structural view of a goods picking system to which embodiments of the present disclosure are applicable. The goods picking system 100 includes: a robot 10, a control system 20, an inventory container area 30, and a picking station (i.e., target workstation) 40. The inventory container area 30 is provided with a plurality of inventory containers 31. One or more inventory items are placed in the inventory container 31. For example, the inventory container 31 is similar to the goods shelf which carries multiple types of goods and can be found in the supermarket. The plurality of inventory containers 31 are arranged in the form of an inventory container array.

The control system 20 communicates with the robot 10 in a wireless manner. A staff operates the control system 20 through a console 60. The robot 10 performs inventory item carrying tasks under the control of the control system 20. For example, the control system 20 plans a moving path for the robot 10 according to a carrying task, and the robot 10 moves along an empty space (part of a passage path of the robot 10) in the inventory container array according to the moving path. In order to conveniently plan a moving path for the robot 10, the working area of the robot 10 (including at least the area where the inventory container area 30 is located and the area where the picking station 40 is located) is divided into a plurality of sub-areas (i.e., cells) in advance, and the robot 10 moves one sub-area by one sub-area to form a moving track.

Figure 10B:
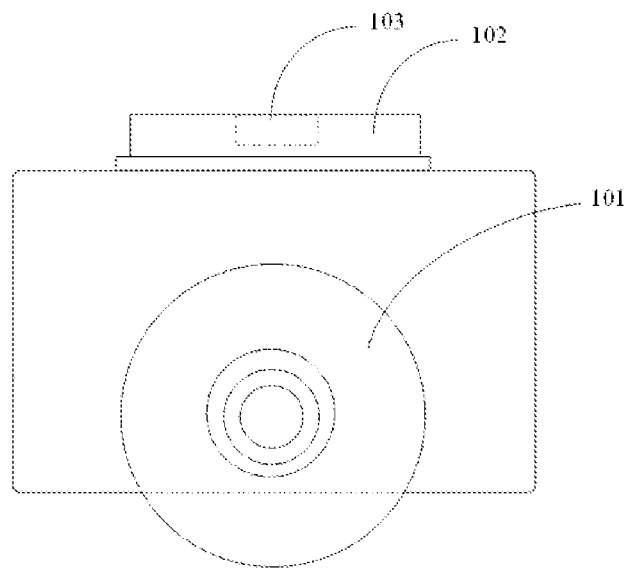
FIG. 10B is a structural view of a robot to which embodiments of the present disclosure are applicable.

Referring to FIG. 10B, the robot 10 may include a driving mechanism 101 by which the robot 10 can move within a workspace. The robot 10 may further include a lifting mechanism 102 for carrying an inventory container. The robot 10 may move to a position below the target inventory container 31, lift the target inventory container 31 with the lifting mechanism 102, and carry the target inventory container 31 to the allocated picking station 40. When lifting, the lifting mechanism 102 lifts the entire target inventory container 31 from the ground so that the robot 10 carries the target inventory container 31. When putting down, the lifting mechanism 102 puts the target inventory container 31 on the ground. When the robot 10 lifts the target inventory container 31, a target recognition component 103 on the robot 10 can effectively recognize the target inventory container 31.

Figure 10C:
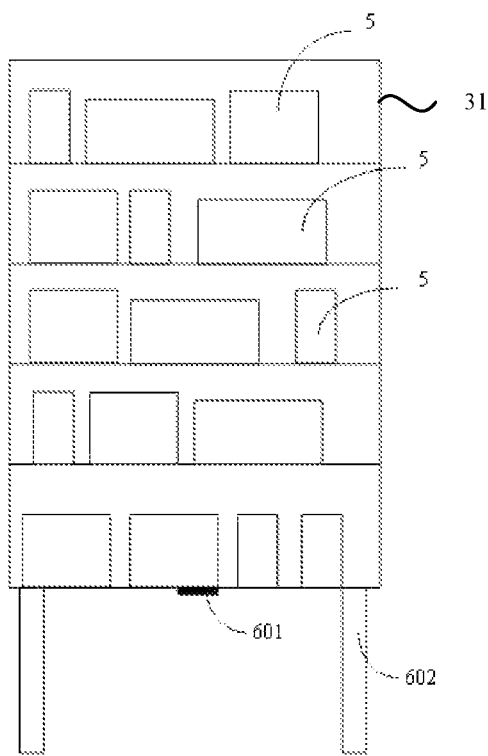
FIG. 10C is a structural view of an inventory container to which embodiments of the present disclosure are applicable.

In addition, if the robot 10 is based on visual navigation, the robot 10 further includes a navigation identification component (not shown in FIG. 10B) configured to identify a navigation mark (e.g., a two-dimensional code) on the paved ground. Of course, the robot 10 further includes a control module (not shown in FIG. 10B) that controls the entire robot 10 to perform functions such as movement, navigation, and the like. In one example, the robot 10 can move forward according to the two-dimensional code information (or other ground identification) captured by the camera, and can travel to a position under the inventory container 31 prompted by the control system 20 according to the route determined by the control system 20. FIG. 10C is a structural view of an inventory container 31 according to embodiments of that present disclosure. As shown in FIG. 10C, the inventory container 31 may be, for example, a shelf, and stores an inventory item 5. Of course, the inventory item 5 may alternatively be stored in a storage container. In one embodiment, the inventory container 31 includes a plurality of compartments arranged vertically, each of which is capable of accommodating a plurality of inventory items 5. The inventory container 31 includes one or more support portions 602. In addition, in one embodiment, the inventory item 5 may be suspended in the inventory container 31 or by hooks or rods in the inventory container 31. The inventory item 5 can be placed in any suitable manner on the inner surface or outer surface of the inventory container 31.

Figure 10D:
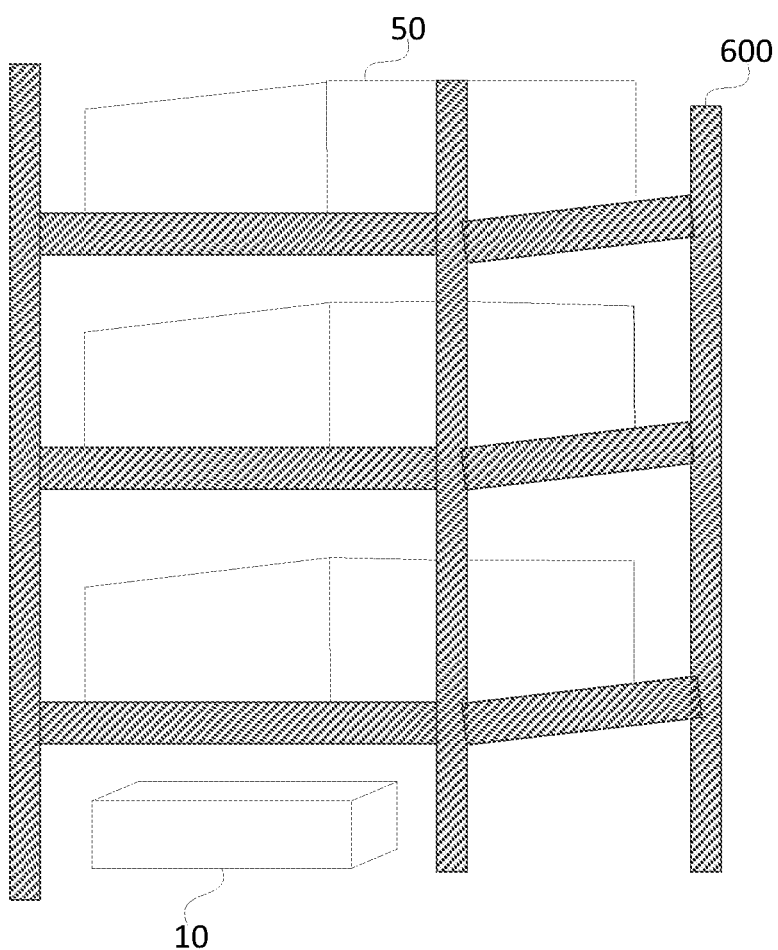
FIG. 10D is a structural view of a sorting wall to which embodiments of the present disclosure are applicable.
Figure 10E:
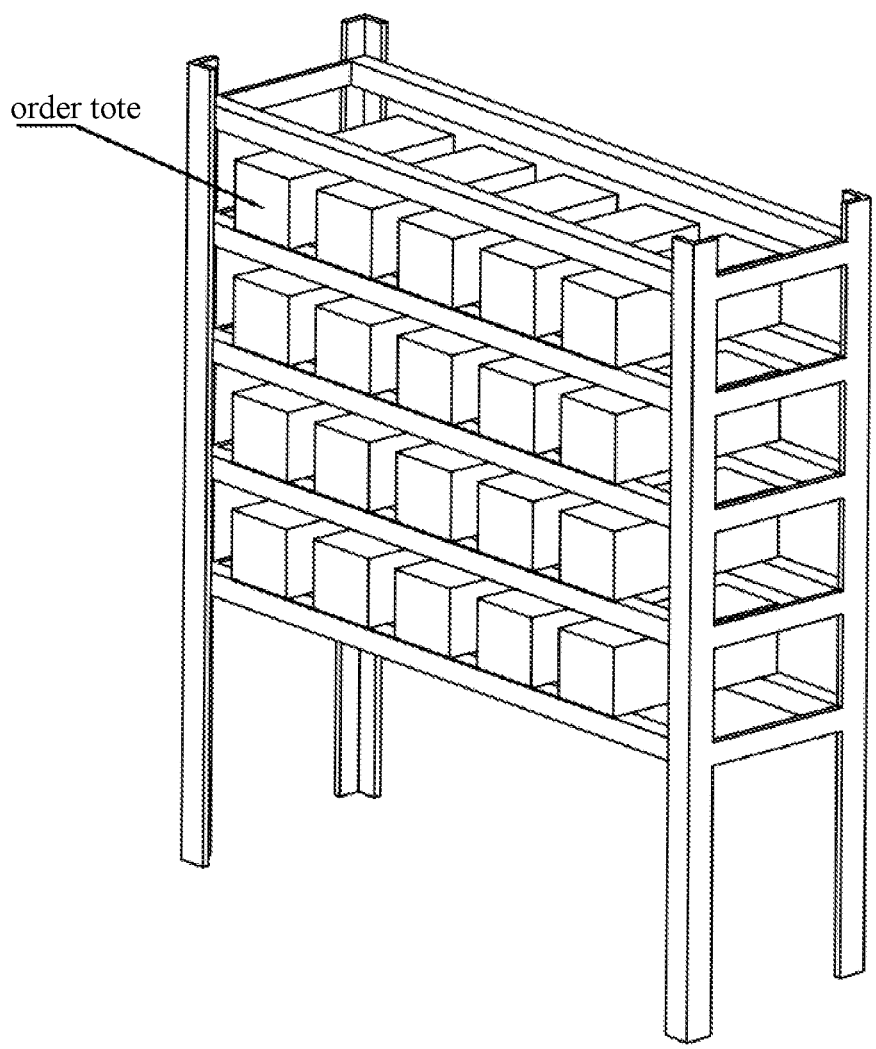
FIG. 10E is a structural view of another sorting wall to which embodiments of the present disclosure are applicable.

The robot 10 carries the target inventory container 31 to the picking station 40. At the picking station 40, a picking staff 41 or picking device, such as a robot arm, picks order items from the inventory container 31 and places them in an order tote (or picking box) 50 on a sorting wall 600 for packing, as shown in FIGS. 10D and 10E. The sorting wall 600 includes a plurality of sorting positions, each of which may carry an order tote 50, and each order tote 50 may accommodate at least one order item. Each sorting position may be provided with an indicator lamp (not shown in FIG. 10D) below the sorting position. For the fixed sorting wall 600, when all the order items in the orders are picked, the picking staff or picking device turns off the indicator lamp, indicating that the order tote 50 in this sorting position can be sent to the packing position, and the order items in the order tote 50 are packed. For the moving sorting wall 600, for example, the moving sorting wall 600 may have its own order tote 50, and the moving sorting wall 600 may be moved to the packing position along with the order tote 50 when all indicator lamps below the sorting positions are turned off. In one embodiment, the moving sorting wall 600 may be manually move to the packing position, and four column feet of the movable sorting wall 600 may each be provided with a roller to facilitate movement of the sorting wall 600. Optionally, the sorting wall 600 may be carried to the packing position by a robot.

The control system 20 is a software system having data storage, information processing capability and running on a server, and can be connected to a robot, a hardware input system, and other software systems in wireless or wired manner. The control system 20 may include one or more servers, and may be a centralized control architecture or a distributed computing architecture. The server may have a processor 2010 and a memory 2020, and the memory 2020 may include an order pool 2020.

In the goods picking system, how to optimize the quantity of inventory containers carried by the robot, reduce the moving distance of inventory containers, and then improve the picking efficiency are the new challenges of the "goods-to-person" intelligent picking system. Therefore, embodiments of the present disclosure provide an order processing scheme to improve picking efficiency.

It should be noted that similar reference numerals and letters in the following drawings indicate similar items, and therefore, once a particular item is defined in a drawing, the item does not need be further defined and explained in following drawings. In the description of embodiments of the present disclosure, the terms "first", "second", etc. are only configured to distinguish the description, and are not to be construed as indicating or implying relative importance.

Embodiment Five

In the traditional picking process, the inventory container is fixed, and the picking staff with a pre-printed picking list or with a scanning gun picks goods in the inventory container. For each picking task, the picking staff is given one or more fixed orders, so it is not possible to dynamically push similar orders to the picking staff.

In the intelligent goods-to-person picking system, the inventory container is moving, and the robot carries the inventory container to the picking workstation. According to the system prompts, the picking staff takes the order items positioned by the order from the storage position and place them into the designated container to complete the picking task. After the picking task is finished, the robot sends the inventory container back to the specified position. When the inventory container is needed by the next order, the robot repeats the carrying process again, and the frequent carrying of the robot leads to a decreased picking efficiency. In addition, because the customer issues orders randomly in time, the system does not know what orders will come in the future, what kind of order items are needed, so it is impossible to analyze the similar degree between orders, and orders are directly disbursed, resulting in low picking efficiency. Therefore, it is necessary to provide a dynamic order processing method for the intelligent "goods-to-person" picking system.

Figure 11:
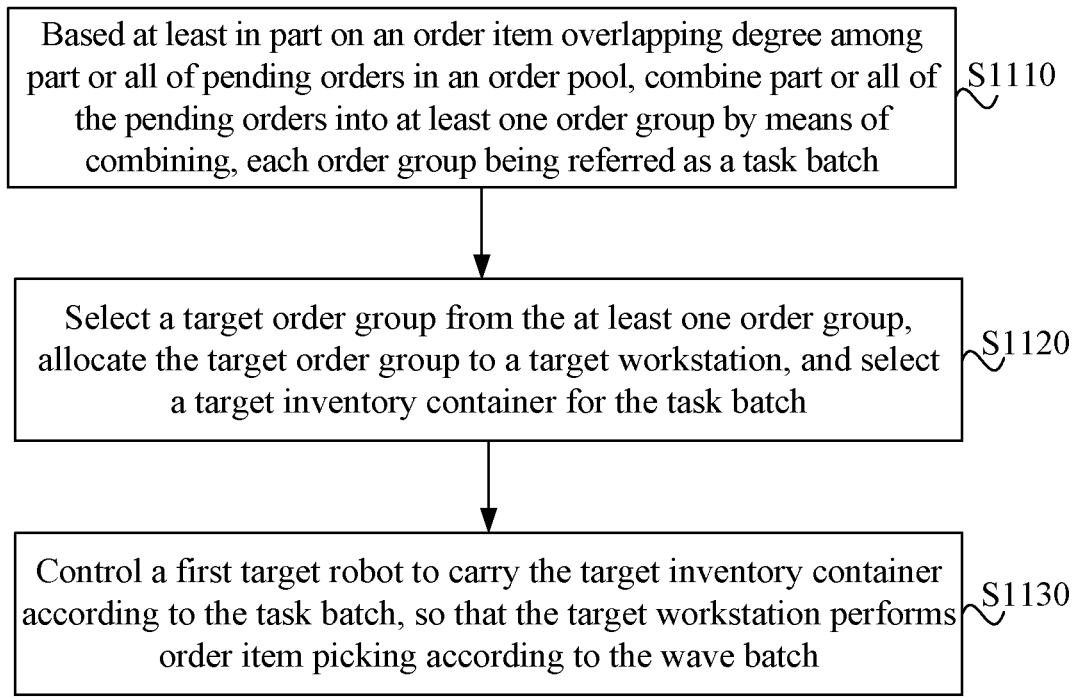
FIG. 11 is a flowchart of another order processing method according to embodiments of the present disclosure.

FIG. 11 is a flowchart of an order processing method provided in Embodiment Five of the present disclosure, which is applicable to a case of how to process orders in the intelligent "goods-to-person" picking system. The method may be performed by an order processing device/server provided in embodiments of the present disclosure. The device/server can be implemented in software and/or hardware. The device/server is configured in a "goods-to-people" intelligent sorting system. The device/server, a robot, a sorting wall, inventory containers, a picking station (also referred to as a target workstation) and the like, form a "goods-to-person" intelligent sorting system. Referring to FIG. 11, the method includes the following steps.

In step S1110, part or all of the pending orders are combined into at least one order group in a combing manner at least partly according to the order item overlapping degree between part or all of the pending orders in the order pool, and one of the at least one order group is taken as one batch of task.

The pending orders refer to the orders to be processed in the order pool, including at least one pending order. The overlapping degree is the order item association degree of the orders. The overlapping degree can be determined based on order information and inventory information according to a certain calculation rule. An order group includes at least one pending order. The order pool is configured in the server's memory.

In one embodiment, selecting a target inventory container matching an order item for a pending order in the batch of task includes: obtaining a plurality of selectable inventory container combinations at least partly according to an inventory container selection rule and algorithm; and taking the inventory container contained in the inventory container combination with the minimum quantity in the plurality of inventory container combinations as the target inventory container.

In one embodiment, at least partly according to the order item overlapping degree (or order item attributes) between part or all of pending orders in an order pool, combining the pending orders into at least one order group in a combining manner may include:

A. The order quantity of the pending orders contained in the order group is determined at least partly according to the quantity of cells of the sorting wall.

The sorting wall is provided at a target workstation (or a picking workstation). The sorting wall is provided with electronic tags for identifying the sorting positions on the sorting wall. In one embodiment, the picking station is further provided with a display device that may display the storage positions of the order items in the inventory container and/or the sorting positions of the order items on the sorting wall. According to the display of the display device, the picking staff knows which goods position of the inventory container the inventory item is located (the inventory item is the order item) and the inventory item is to be placed in the order tote at which the sorting position of the sorting wall. The picking staff picks the relevant inventory item corresponding to the order from the inventory container (the inventory item is the order item), and places it into the order tote at the sorting position corresponding to the order item on the sorting wall, so as to facilitate the subsequent staff to pack and ship.

The quantity of cells in the sorting wall can be the maximum quantity of order item containers that can be accommodated, or the quantity of storage positions, and changes along with the change of the area of order item containers. The quantity of the orders contained in the order group should be less than or equal to the quantity of cells in the sorting wall. If the sorting wall can accommodate 100 order items, when a pending order contains 100 order items, it is determined that the order group only includes one pending order. If each pending order contains only one order item, it is determined that the order group contains 100 pending orders. In one embodiment, the quantity of pending orders included in the order group may be determined based on the quantity of cells in the sorting wall and the quantity of order items per pending order.

B. The pending orders whose order item overlapping degree is greater than or equal to the first overlapping degree threshold and whose quantity is less than or equal to the order quantity are combined into an order group.

The first overlapping degree threshold is a threshold preset according to the actual order situation, and can be modified, and the larger the first overlapping degree threshold is, the greater the order item overlapping degree corresponding to the selected orders is. In one embodiment, the first overlapping threshold is greater than or equal to 95.

In one embodiment, after the quantity of orders in the order group is determined, the orders are ordered according to the order item overlapping degree in a large-to-small sequence, and the pending orders the quantity of which is equal to or less than the order quantity can be selected as an order group. Multiple orders with a high order item overlapping degree can be combined, so that the times that the robot carries the inventory container can be reduced, and the picking efficiency can be greatly improved.

In one embodiment, if the quantity of order items in a pending order in an order group is large, it is possible that the quantity of orders in the order group may be less than a predetermined order quantity.

In order to improve the server combination efficiency, in one embodiment, only if the quantity of pending orders in the order pool reaches a set threshold, steps A and B are used for determining at least one picking order group. For example, if the quantity of pending orders in the order pool reaches 100, a combination can be performed, which can avoid the problem of inefficient combination efficiency in the case where one combination is performed when one pending order is received, and reduce the quantity of combination operations. The quantity of pending orders refers to the number of all pending orders in the order pool. The order quantity is the quantity of orders contained in an order group. In one embodiment, the quantity of pending orders is greater than or equal to the order quantity.

Alternatively, according to an ordering rule of users each day at each period, at least one order group may be determined by periods using steps A and B. In one embodiment, the order quantity of users in each period is determined by statistical analysis; and according to the quantity of orders in one or more periods, the server automatically combines the pending orders in the order pool by periods. For example, a combination is performed for the period from 8:00 a.m. to 12:00, a combination is performed for the period from 12:00 to 5:30 p.m., a combination is performed for the period from 5:30 p.m. to 9:00 p.m., a combination is performed for the period from 9:00 p.m. to 24:00, and a combination is performed for the period from 24:00 to 8:00 a.m. in the next day.

In one embodiment, the quantity of pending orders in a period does not reach the set threshold. But in the case of an urgent order, and the upper limit of the period has been reached, preferably, only the order is processed in real time only. Alternatively, the receiving time of the order is taken as the end time, only orders from the lower limit of the period to the end time are combined, and orders from the end time to the upper limit is incorporated into the next period or performed as a single combination. Other reasonable methods of processing may also be employed, and the present embodiment is not limited herein.

In order to avoid the occurrence of a shipping time of an order placed by a user earlier being later than a shipping time of an order placed by a user later, exemplarily, before pending orders whose goods overlapping degree is greater than or equal to the first overlapping degree threshold and whose quantity is less than or equal to the order quantity are combined into an order group, the method further includes the following step: at least partly according to the priority and creation time of each of the pending orders, the pending orders are preliminarily filtered according to the preset filtering rule.

The priority of the order can be the priority of the user who places the order, and includes a VIP user, a special user, and an ordinary user. Creation time refers to the placing time of the pending order.

The preset filtering rule is preset rule for the preliminary filtering of the pending orders, such as the order of the user with a high priority is processed preferentially; and the pending order whose creation time is earlier is processed preferentially than the pending order whose creation time is later.

In one embodiment, after the order quantity is determined, the server performs preliminary filtering on the pending orders according to the priority and creation time of the order in each pending order in the order pool and the preset filtering rule.

Correspondingly, the pending orders whose order item overlapping degree is greater than the first overlapping degree threshold and whose quantity is less than or equal to the order quantity are combined into an order group, including the following step.

The filtered pending orders whose order item overlapping degree is greater than or equal to the first overlapping degree threshold and whose quantity is less than or equal to the order quantity are combined into an order group.

In the present embodiment, after preliminary filtering of the pending orders in the order pool, the filtered pending orders are according to the order item overlapping degree in a large-to-small sequence, and pending orders whose quantity is equal to or smaller than the order quantity are finally selected as an order group, thereby avoiding the occurrence of a shipping time of an order placed by a user earlier being later than a shipping time of an order placed by a user later. At the same time, a plurality of orders with high order item overlapping degree can be combined to reduce the times the robot carrying inventory containers, thus greatly improving the picking efficiency.

In step S1120, a target order group is selected from at least one order group and allocated to a target workstation, and a target inventory container is selected for the batch of task.

In step S1130, the first target robot is controlled to carry the target inventory container according to the batch of task, so that the target workstation performs order item picking according to the batch of task.

The batch of task may include at least one order group; the target inventory container accommodates the order items associated with the batch of task.

In one embodiment, at least one order group is obtained after the pending orders in the order pool are grouped, and the orders can be randomly assigned to one or more workstations. In one embodiment, each order group may be numbered according to the order time or priority, etc., and the order group numbered at the front may be randomly assigned to one or more workstations. The target workstation is one of at least one workstation. Correspondingly, the order group obtained by the target workstation is the target order group.

In one embodiment, when the batch of task is allocated to the target workstation in the embodiment of the present disclosure, the target order is also allocated to the sorting wall, so that the sorting wall establishes the mapping relationship between the sorting wall, the storage position and the order, and the subsequent picking staff can efficiently perform the order item picking according to the order information. In addition, compared with the related arts in which the inventory is located before the order is allocated to the target workstation, the embodiment of the present disclosure locates the inventory (i.e., the inventory container) only after the order group is allocated to the target workstation, which increases the optimization space because the order group does not locate the inventory in advance.

In one embodiment, when the batch of task is allocated to the target workstation, according to the order information and inventory information of the order group, the quantity and positions of the inventory containers of the order items corresponding to the batch of task can be obtained and located. However, in order to minimize the times a robot carrying inventory containers, in the embodiment of the present disclosure, when the order items corresponding to the batch of task are completely included, the inventory container selection is carried out according to certain inventory container selection rules and algorithms, and a plurality of inventory container combinations can be obtained accordingly. The corresponding inventory containers in an inventory container combination with the minimum inventory container quantity among the plurality of inventory container combinations are taken as the target inventory containers; and correspondingly, the robot carrying the target inventory container is the first target robot.

Exemplarily, controlling the first target robot to perform target inventory container carrying according to batch of task may include: determining a target inventory container at least partly according to target order information, inventory information, and an inventory container selection strategy; determining the first target robot according to the target inventory container and the optimal path for the robot to reach the target inventory container, and controlling the first target robot to carry the target inventory container.

The inventory container selection strategy may include the quantity of inventory items in the inventory container, the distance between the inventory container and the workstation, and the relationship between the positions of the inventory containers, such as the adjacent or spaced placement of the inventory containers. The optimal path is the path with the shortest distance and the least obstacles between the target inventory container and the first target robot. When the first target robot receives an instruction and/or a path planning for carrying the target inventory container, the first target robot automatically moves to a position right below the target inventory container, lifts the target inventory container, and carries the target inventory container to the target workstation. The target workstation performs order item filtering according to the order information of the pending orders in the batch of task, and places the order item corresponding to each pending order obtained by the filtering into the corresponding position of the sorting wall until all the pending orders in the batch of task are processed.

According to the order processing method of the embodiment of the present disclosure, combining process is performed on the pending orders in the order pool according to the order item overlapping degree to obtain at least one order group, the batch of task is selected from the at least one order group and allocated to a target workstation, and a first target robot is controlled to perform target inventory container carrying so that the target workstation performs order item picking according to the target order, thereby realizing order processing in the entire process of "goods-to-person" intelligent order picking. The present embodiment solves the problem of low picking efficiency caused by directly dispursing orders without analyzing the similarity degree between orders in the "goods-to-person" intelligent picking system in the related arts, combines a plurality of orders, reduces the times of the robot carrying the inventory containers, and greatly improves the picking efficiency.

Embodiment Six

Figure 12:
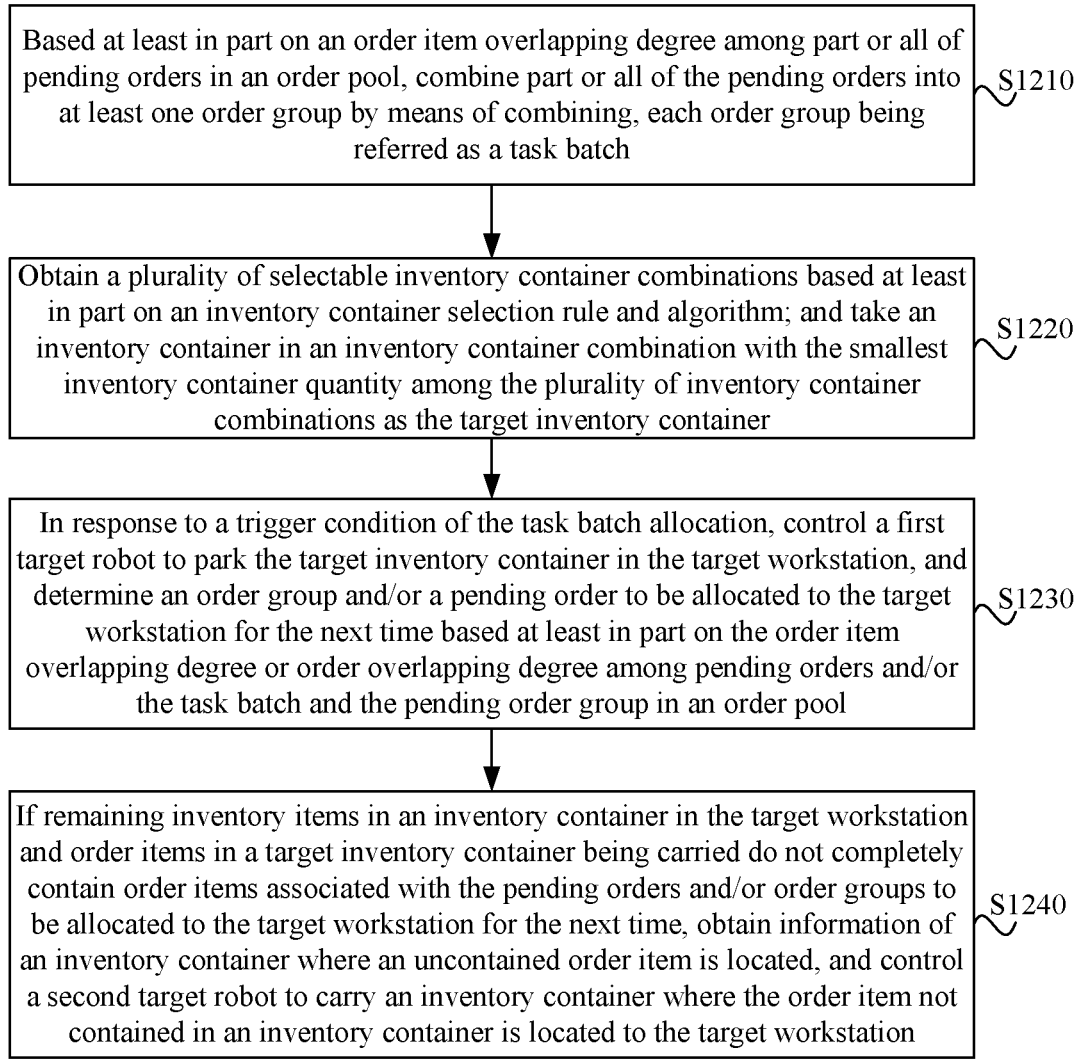
FIG. 12 is a flowchart of another order processing method according to embodiments of the present disclosure.

FIG. 12 is a flowchart of an order processing method provided in Embodiment Six of the present disclosure, which is further an optimization of the order processing method on the basis of the above embodiment. Referring to FIG. 12, the method includes the following steps.

In step S1210, at least partly according to the order item overlapping degree of part or all of pending orders in an order pool, part or all of the pending orders are grouped into at least one order group in a combining manner, where one order group is one batch of task.

In step S1220, a plurality of selectable inventory container combinations are obtained at least partly according to an inventory container selection rule and algorithm; and inventory containers contained in the inventory container combination with the minimum inventory containers quantity in the plurality of inventory container combinations are taken as inventory containers.

The target inventory container accommodates the order items associated with the batch of task.

In step S1230, in response to a trigger condition of the batch of task allocation, the first target robot is controlled to park the target inventory container in the target workstation, and an order group and/or pending order to be allocated to the target workstation for the next time is determined at least partly according to the order item overlapping degree or order overlapping degree between batch of task and pending order groups and/or pending orders in the order pool.

The overlapping degree between order groups or between order groups and order items is the order overlapping degree. By weighting the overlapping degree of order items corresponding to each order in the order group, integration information of the order group is obtained, and the order overlapping degree is obtained by comparing two pieces of integration information or a certain piece of integration information with the order items. Integration information is used for reflecting the common characteristics of an order group. Order overlapping degree also reflects the association degree between order groups or between order groups and order items. The trigger condition may be that the target workstation completes the picking of one or more order groups, or the target workstation completes the picking of all the batch of tasks and sends picking completion information to the server. The trigger condition may also be that the sorting wall detects that all or most of the order items corresponding to the batch of task have been placed in the corresponding positions of the sorting wall, and then sends picking completion information sent to the server. The pending orders here may be orders that are grouped with other orders after a grouping processing or orders that are just added to the order pool and not grouped.

In one embodiment, the trigger condition is a condition that the server is informed to execute the subsequent allocation of the next picked order to the target workstation, and may be any of the trigger conditions provided in the present embodiment, or other reasonable conditions, which are not limited herein. Moreover, in order to enable the order items in the target inventory container in the workstation to be picked out as many as possible, in the present embodiment, a single pending order that is not grouped into any order group is also considered when considering whether the order item associated with the pending order in the order pool can match the order item in the inventory container of all the order groups allocated to the target workstation.

The following operation process may be used. The target workstation detects that one or more order groups have been picked and then sends picking completion information to the server, alternatively, the target workstation detects all the batch of tasks are picked and then sends the picking completion information to the server. After receiving the picking completion information, the server places the target inventory container corresponding to the batch of task into a locking area configured by the system; and determines the order group and/or the pending order to be allocated to the target workstation for the next time according to the order item overlapping degree between the batch of task and pending order groups and/or pending orders in the order pool, and allocates the determined order group and/or pending order to the target workstation. In order to improve the picking efficiency, the order group and/or the pending order to be allocated to the target workstation for the next time are determined according to the order item overlapping degree between the batch of task and pending order groups and/or pending orders in the order pool, and the determined order group and/or the pending order are allocated to the target workstation.

Optionally, the sorting wall may be provided with a communication device. When the display device of the sorting wall displays that all or most of the order items corresponding to the batch of task have been placed in the corresponding positions of the sorting wall, the picking completion information can be sent to the server through the communication device or the picking staff can send the picking completion information to the server through the communication device. After receiving the picking completion information, the server places the target inventory container corresponding to the target picking order group into the locking area configured by the system; determines the order group and/or the pending order to be allocated to the target workstation for the next time according to the order item overlapping degree or the order item overlapping degree between the target picking order group and the pending order groups and/or the pending orders in the order pool; and disburses the determined order group and/or the pending order to the target workstation. The server system is provided with a locking area, a storage area and a dynamic area, and the robot can pull the inventory container in the storage area and the dynamic area, but cannot pull the inventory container in the locking area.

Correspondingly, the workstation may be provided with a picking area or a buffer area. The picking area refers to an area where the order item picking is performed in an inventory container carried by a robot in a queue. The buffer area refers to an area where the inventory container carried by the robot in the queue is waiting for the order item picking. Therefore, the server will control the target robot to park the target inventory container in the picking area and/or buffer area in the target workstation.

Exemplarily, according to the order group completion state of each workstation, the next order group and/or pending order allocation is dynamically performed for each workstation. In the "goods-to-person" intelligent picking system in the related arts, after the picking staff picks the required order item, places the required order item into the specified container according to the prompts, and completes the picking task, the robot will move the inventory container back to the specified position, and when the inventory container is needed by the next order, the robot needs to repeat the moving process again, which leads to the problem of low picking efficiency. The dynamic allocation solves the problem and ensures that a plurality of workstations reach the high load picking state, thereby improving the overall picking efficiency.

Exemplarily, determining the order group and/or pending order to be allocated to the target workstation for the next time according to the order item overlapping degree between the batch of task and pending order groups and/or pending orders in the order pool may include: comparing the remaining inventory items in the inventory container of the target workstation and the order items in the inventory container that is being moved with the pending order groups in the order pool and/or order items in the pending orders, and taking the order group whose order item overlapping degree is greater than the second overlapping degree threshold as the next order group.

The second overlapping degree threshold may be the same as the first overlapping degree threshold, and the larger the value of the second overlapping degree threshold, the greater the overlapping degree between the selected order items.

In the present embodiment, the remaining inventory items in the inventory container refer to the remaining inventory items in the inventory container corresponding to at most two batch of tasks, for example, the remaining inventory items in the inventory container corresponding to the batch of task. By comparing the remaining inventory items in the inventory container in the target workstation and the order items in the inventory container in moving with the order items in the pending order group in the order pool, the order group and/or the pending order to be allocated to the target workstation for the next time are determined. The order group and/or the pending order with a high order item overlapping degree are allocated, thereby avoiding the inconvenience caused by the inventory container accumulation to the picking task of the picking staff.

To further improve the picking efficiency, the next allocation of the order group and/or pending order for the target workstation may be performed according to the overlapping degree between orders. Exemplarily, determining the order group and/or pending order to be allocated to the target workstation for the next time according to the order item overlapping degree between the batch of task and pending order groups and/or pending orders in the order pool may include: comparing the remaining inventory items in the inventory container of the target workstation and the order items in the inventory container in moving with the pending order groups and/or the pending orders in the order pool, and taking the order group and/or the pending order whose order item overlapping degree is greater than the third overlapping degree threshold as the order group and/or the pending order to be allocated to the target workstation for the next time.

The third overlapping degree threshold may be the same as the first overlapping degree threshold and/or the second overlapping degree threshold, and the larger the value of the third overlapping degree threshold, the greater the overlapping degree between the selected order items. The order overlapping degree can be determined when the order group is determined by combining the pending orders, or can be determined after the order group is determined.

In one embodiment, the order groups are numbered based on their order time or priorities. According to the numbers of the pending order groups in the order pool, each order group as a whole is compared with the remaining inventory items in the inventory container in the picking area of the target workstation and the order items in the inventory container that is being moved, the corresponding order overlapping degree is obtained. The order groups are ranked according to their order overlapping degrees. The order group with the largest order overlapping degree is allocated to the target workstation as the next order group.

In the present embodiment, the allocation of the next order group is performed by considering the priority, time and overlapping degree of the order group, the phenomenon that the shipping time of the user who places the order earlier is later than the shipping time of the user who place the order later can be avoided. At the same time, the order group with a high order overlapping degree is allocated, thereby reducing the times the robot carrying the inventory containers, and greatly improving the picking efficiency.

Exemplarily, if the number of the selected order group with the largest order overlapping degree is greater than one and there are a plurality of order groups with the largest order overlapping degree, selection is performed according to the order group numbers. The order group having a smaller order group number is taken as the next order group. In order to increase the picking speed, the remaining inventory items in the inventory container of the target workstation and the order items in the inventory container that is being moved are compared with the pending orders in the order pool, and the pending order whose order overlapping degree is greater than the third overlapping degree threshold is taken as the pending order to be allocated to the target workstation for the next time. Alternatively, the pending order groups and the pending orders are compared with the remaining inventory items in the inventory container of the target workstation and the order items in the inventory container that is being moved at the same time, the order group and the pending order with an order overlapping degree greater than the third overlapping degree threshold are taken as the order group and the pending order to be allocated to the target workstation for the next time.

In step S1240, if not all of order items associated with the order group and/or pending order to be allocated to the target workstation for the next time are contained in remaining inventory items in an inventory container in the target workstation and order items in a target inventory container being carried, information of an inventory container where the uncontained order item is located is obtained, and a second target robot is controlled to carry the inventory container where the order items not contained in the inventory container is located to the target workstation.

The second target robot refers to a robot that carries the inventory containers corresponding to the order group and/or pending order to be allocated to the target workstation for the next time. The second target robots and the first target robots may be the same robots, or the second target robots and the first target robots may be partially the same, or the second target robots are completely different from the first target robots.

After the next order group and/or the pending order are allocated to the target workstation, the server determines whether order items associated with the next order group and/or the pending order are all contained in the remaining inventory items in the inventory container of the target workstation and the order items in the inventory container that is being moved. If the order items associated with the next order group and/or the pending order are all contained in the remaining inventory items in the inventory container of the target workstation and the order items in the inventory container that is being moved, the server controls the target workstation to perform order item picking according to the next order group and/or the pending order. If not all of the order items associated with the next order group and/or the pending order are contained in the remaining inventory items in the inventory container of the target workstation and the order items in the inventory container that is being moved, the server controls the target workstation to perform order item picking according to the next order group and/or the pending order, and meanwhile the server determines the inventory container where the uncontained order item is located and the second target robot according to the order information, inventory information, the inventory container selection strategy and the optimal path. The server controls the second target robot to move the inventory container. In this way, picking and inventory container moving are performed at the same time, thereby reducing the waiting time of the picking staff and improving the picking efficiency. In addition, this scheme also improves the logistics speed of E-commerce companies and improves the utilization rate of warehouses, thus improving the service quality of E-commerce service companies and customer satisfaction.

According to the order processing method of embodiments of the present disclosure, at least one order group are obtained by combining part or all of the pending orders in the order pool at least partly according to the order item overlapping degree; a plurality of selectable inventory container combinations are obtained at least partly according to the inventory container selection rule and algorithm; and the inventory container contained in the inventory container combination with the smallest inventory container quantity in the plurality of inventory container combinations is taken as the target inventory container. In the "goods-to-person" intelligent picking system in the related arts, after the picking staff picks the required order item, places it into a specified container according to the prompt and completes the picking task, the robot will send the inventory container back to a specified position, and when the inventory container is needed by the next order, the robot will repeat the inventory container moving process, leading to the problem of low picking efficiency. The present embodiment can solve this problem in the "goods-to-person" intelligent picking system in the related arts, and ensures the picking workstations being the high load picking state, and further improves the overall picking efficiency.

Embodiment Seven

Figure 13:
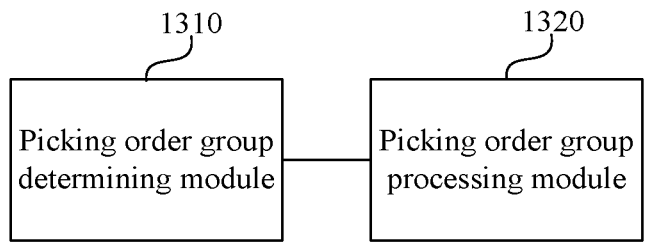
FIG. 13 is a structural block view of another order processing device according to embodiments of the present disclosure.

FIG. 13 is a structural block view of another order processing device according to Embodiment Seven. The device can execute the order processing method in embodiments of the present disclosure, and has functional modules and effects corresponding to the execution of the method. As shown in FIG. 13, the device may include: a picking order group determining module 1310, and a picking order group processing module 1320.

The picking order group determining module 1310 is configured to, at least partly according to an order item overlapping degree of part or all of pending orders in an order pool, group the pending orders into at least one order group in a combining manner, where one order group is one batch of task.

The picking order group processing module 1320 is configured to obtain a plurality of selectable inventory container combinations at least partly according to an inventory container selection rule and algorithm; and take an inventory container contained in one of the plurality of inventory container combinations with the smallest inventory container quantity as a target inventory container.

The order processing device provided by embodiments of the present disclosure realizes the order processing in the entire process of "goods-to-person" intelligent picking, and solves the problem of low picking efficiency in the "goods-to-person" intelligent picking system in the related arts in which orders are directly disbursed without analyzing the similarity degree of the orders. Multiple orders are combined. The number of times the robot carrying the inventory containers is reduced, and the picking efficiency is greatly improved.

Exemplarily, the picking order group determining module 1310 is configured to:

determine the order quantity of the pending orders contained in the order group at least partly according to the quantity of cells of the sorting wall; and combine the pending orders whose order item overlapping degree is greater than or equal to the first overlapping degree threshold and whose quantity is less than or equal to the order quantity into an order group.

In one embodiment, the above device may further include: a preliminary filtering module.

The preliminary filtering module is configured to perform preliminary filtering on the pending orders according to a preset filtering rule and at least partly according to the priorities, order cut-off time and creation time of pending orders.

The picking order group determining module is further configured to combine the filtered pending orders whose order item overlapping degree is greater than or equal to the first overlapping degree threshold and whose quantity is less than or equal to the order quantity into an order group.

In one embodiment, the above device may further include: a next picking order group determining module.

The next picking order group determining module is configured to, after controlling a first target robot to perform target inventory container moving according to at least one target picking order group, in response to a trigger condition of the batch of task allocation, control the first target robot to park a target inventory container in the target workstation, and determine an order group and/or pending order to be allocated to the target workstation for the next time according to the order item overlapping degree or order overlapping degree between the batch of task and pending order groups and/or pending orders in the order pool.

Exemplarily, the next picking order determining module is configured to: compare the remaining inventory items in the inventory container of the target workstation and order items in the inventory container that is being moved with pending order groups in the order pool and/or order items in the pending orders, and take order groups and/or pending orders with order item overlapping degrees greater than the second overlapping degree threshold as order groups and/or pending orders to be allocated to the target workstation for the next time.

Exemplarily, the next picking order determining module is configured to: compare the remaining inventory items in the inventory container of the target workstation and order items in the inventory container that is being moved with pending order groups in the order pool and/or pending orders, and take order groups and/or pending orders with order item overlapping degrees greater than the second overlapping degree threshold as order groups and/or pending orders to be allocated to the target workstation for the next time.

In one embodiment, the picking order group processing module 1320 is also configured to: if the remaining inventory items in the inventory container of the target workstation and order items in the inventory container that is being moved do not contain all order items associated with the order group and/or pending order to be allocated to the target workstation for the next time, acquire information of an inventory container where the uncontained order item is located, and control a second target robot to perform inventory container moving according to the inventory container information and the order group and/or pending order to be allocated to the target workstation for the next time.

Exemplarily, the picking order group processing module 1320 is further configured to determine a target inventory container at least partly according to target order information, inventory information, and an inventory container selection strategy; determine a first target robot according to the target inventory container and the optimal path for a robot to reach the target inventory container, and control the first target robot to carry the target inventory container.

Embodiment Eight

An order having only one item (also referred to as single-item-single-piece order) accounts for a large proportion of the orders in the E-commerce industry, and this kind of order makes the warehouse management more difficult and complex.

In traditional warehouses or automated stereo warehouses, the traditional picking and packing mode includes a picking-while-sorting mode. The picking-while-sorting mode refers to placing the order items corresponding to different orders into different packing boxes or different goods boxes of the picking trolley during the picking process. After picking is completed, in the rechecking and packing process, each packing box is rechecked by scanning codes to ensure the quality and quantity of the order items. However, the picking and sorting mode still has the following disadvantages. When the related traditional picking mode faces a large quantity of single-piece orders, because of the limited goods boxes of the picking trolley, order tasks in one batch may need to be picked for multiple times, which leads to a lot of repetition of picking path, picking work and checking work, and brings huge waste of resources and load to warehouse management system, human resources and equipment, and this situation will be magnified with the usage of warehouse automation, especially logistics robot, thus making warehouse management efficiency and automation utilization rate low.

Figure 14:
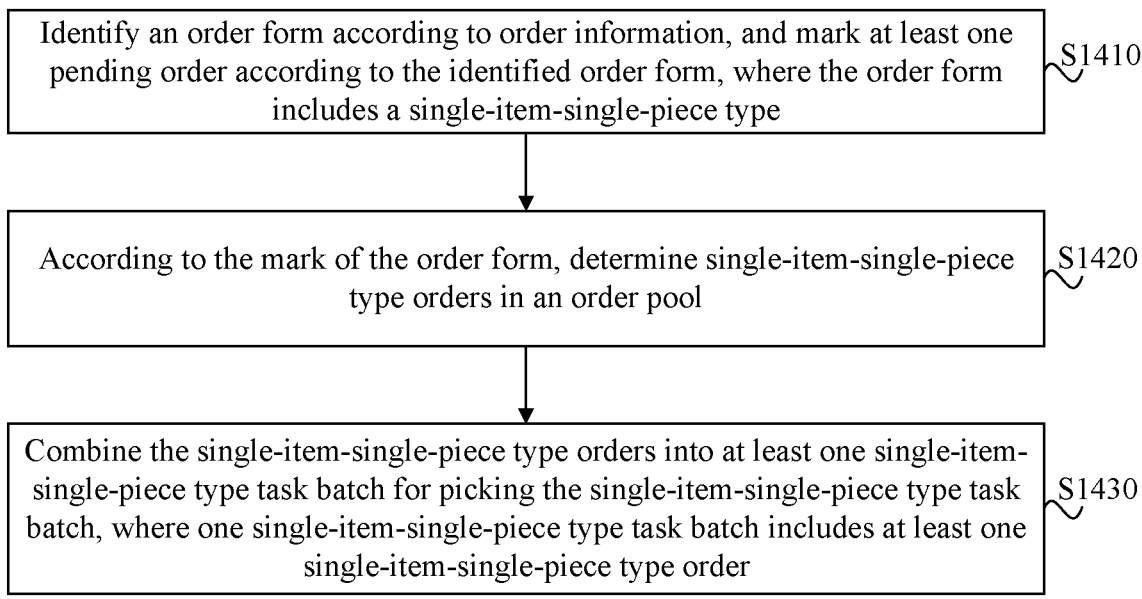
FIG. 14 is a flowchart of another order processing method according to embodiments of the present disclosure.

FIG. 14 is a flowchart of an order processing method according to Embodiment Eight. The present embodiment is applicable to the case where combining-picking and rechecking and packing are used for the single-item-single-piece type orders. The method can be executed by an order processing device, which can be implemented in software and/or hardware, and can be configured in a server within a control system as shown in FIG. 14. The method includes the following steps.

In step S1410, an order form is identified according to order information, and at least one pending order is marked according to the identified order form, where the order form includes a single-item-single-piece type.

After a user purchases goods and places an order in the network mall, the order enters an Order Management System (OMS), a warehouse is determined according to the OMS, and order information is sent to an order pool of a Warehouse Management System (WMS). The order information includes the express information, a category and quantity of an order item, and so on. According to the category and quantity of the order item, the order form of each order is determined. The order form includes a single-item-single-piece type, a single-item-multi-piece type and a multi-item-multi-piece type. The Warehouse Management System (WMS) identifies the order form according to the received order information and marks the identified order form for subsequent filtering of pending orders in the order pool.

In step S1420, according to the mark of the order form, the single-item-single-piece type orders in the order pool are determined.

In the present embodiment, for all the orders marked with the order form in the order pool, all single-item-single-piece type orders can be filtered out through an intelligent algorithm for classification. In one embodiment, the filtered single-item-single-piece type orders may also be further classified. Exemplarily, single-item-single-piece type orders including the same order item are classified into one class, or single-item-single-piece type orders with the same order destination are classified into one class.

In step S1430, the single-item-single-piece type orders are combined into at least one single-item-single-piece type batch of task for picking the single-item-single-piece type batch of task, where one single-item-single-piece type batch of task includes at least one single-item-single-piece type order.

In the present embodiment, the single-item-single-piece type orders may be grouped according to a batch grouping strategy. The batch grouping strategy includes an order form dimension, which can be flexibly adjusted according to the warehouse management and business requirements to realize the elastic adaptation of the single-piece combining. In one embodiment, based on the single-item-single-piece type orders filtered out in step S1420, and according to the batch grouping strategy, a certain quantity of single-item-single-piece type orders are grouped to obtain at least one single-item-single-piece type batch of task, wherein the single-item single-item-single-piece type batch of task includes at least one single-item-single-piece type order, so as to carry out centralized combining-picking and subsequent rechecking and packing for each single-item-single-piece type batch of task.

In the present embodiment, a warehouse management information system identifies and marks order forms according to the order information, selects single-item-single-piece type orders, and groups the orders according to the batch grouping strategy to obtain at least one single-item-single-piece type batch of task, so as to carry out picking and rechecking and packing according to the obtained at least one single-item-single-piece type batch of task. Therefore, the picking and rechecking and packing efficiency of single-item-single-piece type orders can be improved, and the efficiency of the entire warehouse operation process can be improved.

Embodiment Nine

Figure 15:
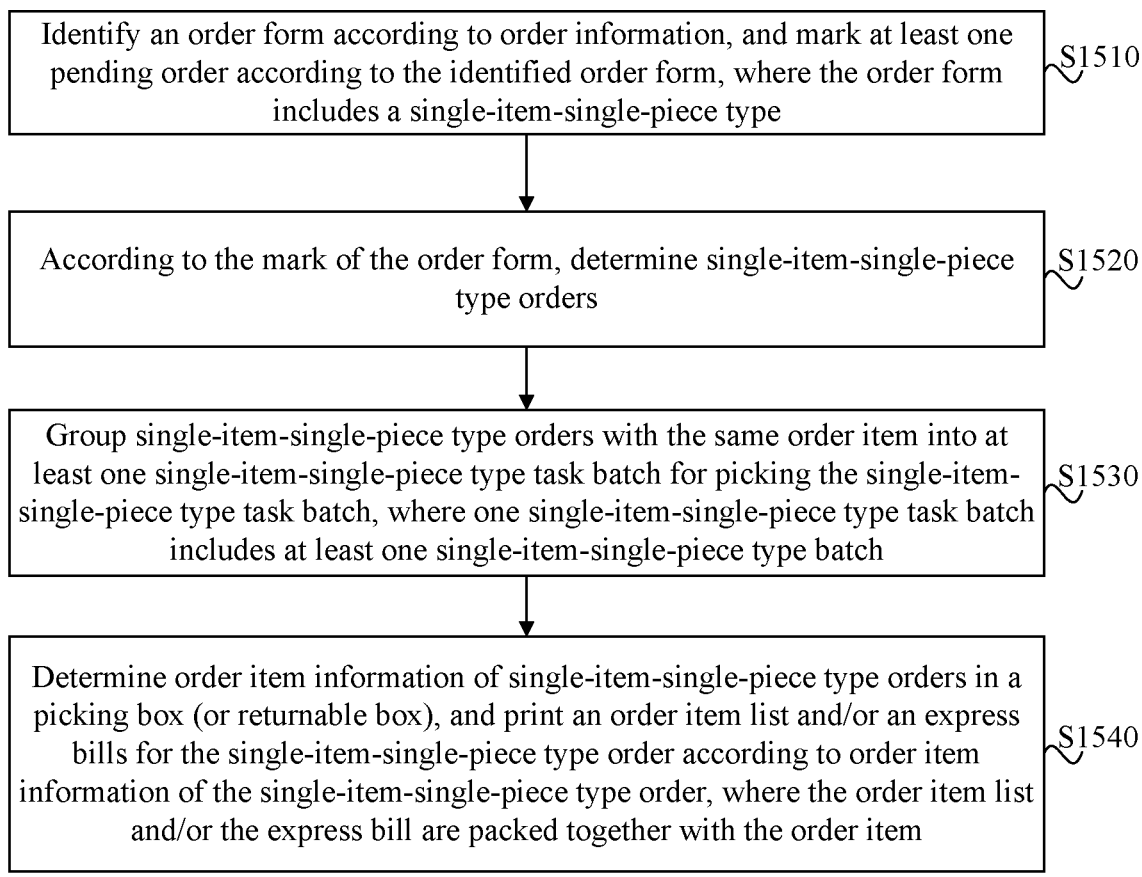
FIG. 15 is a flowchart of another order processing method according to embodiments of the present disclosure.

FIG. 15 is a flowchart of another order processing method according to Embodiment Nine.

The present embodiment is an optimization on the basis of the above embodiments, and the order processing method includes the following steps.

In step S1510, an order form is identified according to order information, and at least one pending order is marked according to the identified order form, where the order form includes a single-item-single-piece type.

In step S1520, according to the mark of the order form, single-item-single-piece type orders are determined.

In the present embodiment, orders with the same order item among the single-item-single-piece orders are filtered out from the order pool.

In step S1530, orders with the same order item in the single-item-single-piece type orders are combined into at least one single-item-single-piece type batch of task for picking the single-item-single-piece type batch of task, where one single-item-single-piece type batch of task includes at least one single-item-single-piece type order.

According to the marked order form, the single-item-single-piece type orders are selected, and orders with the same order item are filtered out from the single-item-single-piece type orders to form at least one single-item-single-piece type batch of task. Exemplarily, an order quantity threshold may be configured in advance for each task to ensure that the number of picking times of each batch of task is reduced as much as possible. According to the orders with the same order item in the determined single-item-single-piece type orders, the relationship between the quantity of the orders and a first quantity threshold is determined. If the determined order quantity is less than or equal to the first quantity threshold, the determined orders are combined into one single-item-single-piece type batch of task. If the determined order quantity is greater than the first quantity threshold, the determined orders are combined into at least two single-item-single-piece type batch of tasks according to the determined order quantity and the first quantity threshold, such that the order quantity of each of the at least two single-item-single-piece batch of tasks is less than or equal to the first quantity threshold, where the first quantity threshold may be determined based on actual business, e.g., the first quantity threshold is 100.

In the following, order items of the same type can be picked centrally according to the single-item-single-piece batch of task. During picking, order items in one batch of task can be placed into one picking box, and distribution is not required, and the total quantity of orders in each batch of task is less than the first quantity threshold, thereby the number of picking times of each batch of task is reduce, in particular for order items with a small volume, orders in one batch can be picked through one picking operation, and the picked order items will be directly sent to a rechecking and packing station for rechecking and packing. In one embodiment, both the position for picking order item and the position for rechecking packing station may be referred to as a target workstation.

In step S1540, order item information of single-item-single-piece type orders in a picking box (or order tote) is determined, and order item lists and/or express bills of the single-item-single-piece type orders are printed according to order item information of the single-item-single-piece type orders. The order item list and/or the express bill are packed together with the order item, where the quantity of packed packing boxes is the same as the quantity of single-item-single-piece type orders in the picking box.

Rechecking the order items in the picking box at the rechecking and packing station includes checking the quantity of order items in the picking box, the damage condition of the outer package and the order item information. Since the order items are the same, the order item information of all orders in the batch can be obtained simply by scanning the bar code on any order item. During the rechecking process, if abnormality is found, an abnormal order handling mechanism is started. If there is no abnormality, the packing material and packing boxes of the same quantity are determined according to the order item information and the order item quantity. At the same time, order item lists or express bills of the same quantity are printed so as to pack the order item lists or express bills with the order items at the packing station. In one embodiment, each order item list or express bill and any order item are placed in a packing box, and the packing is completed at a designated packing station.

In the present embodiment, orders with the same order items in the single-item-single-piece type orders are grouped into at least one single-item-single-piece type batch of task, and picking is centrally performed according to the batch of task. The packing materials and the order item lists or the express bills can be determined by just obtaining the order item information of any single-item-single-piece order at the rechecking and packing station, and the order item lists and/or the express bills and the order items are packed at the packing station, thereby realizing batch rechecking and batch packing of the orders in this batch.

Embodiment Ten

Figure 16:
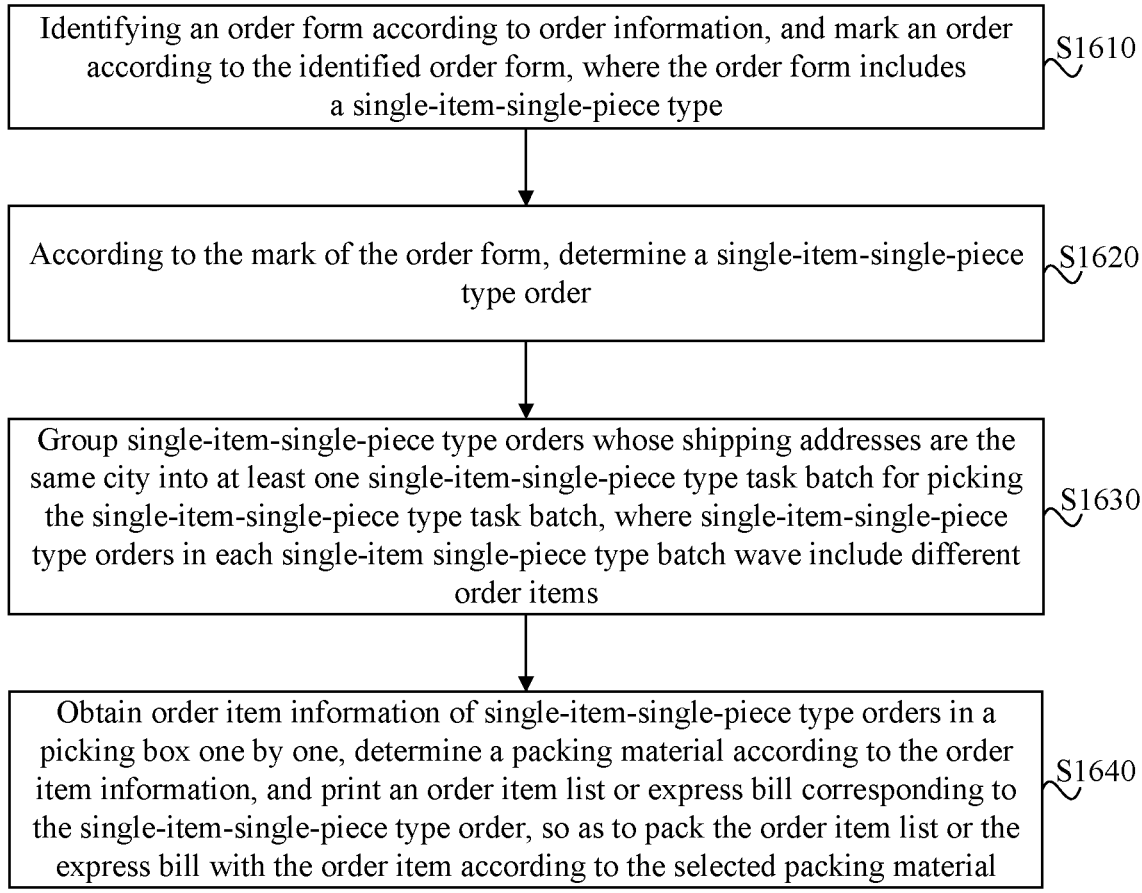
FIG. 16 is a flowchart of another order processing method according to embodiments of the present disclosure.

FIG. 16 is a flowchart of another order processing method according to Embodiment Ten. The present embodiment is an optimization on the basis of the above embodiments, and the method specifically includes the following steps.

In step S1610, an order form is identified according to order information, and an order is marked according to the identified order form, where the order form includes a single-item-single-piece type.

In step S1620, according to the mark of the order form, the single-item-single-piece type order is determined.

In the present embodiment, orders whose order distribution addresses are directed to the same city are filtered out from the single-item-single-piece type orders in the order pool.

In step S1630, the orders whose order distribution addresses are directed to the same city among the single-item-single-piece type orders are grouped into at least one single-item-single-piece type batch of task for picking the single-item-single-piece type batch of task, where single-item-single-piece type orders in each single-item-single-piece type batch of task include different order items.

In the present embodiment, according to different cities of order distribution addresses, single-item-single-piece type orders which have different order items but their distribution addresses are directed to the same city are filtered out. The relationship between the quantity of the single-item-single-piece type orders whose distribution addresses are directed to the same city and a second quantity threshold is determined. If the determined order quantity is less than or equal to the second quantity threshold, the determined orders are combined into a single-item-single-piece type batch of task. If the determined order quantity is greater than the second quantity threshold, the determined orders are combined into at least two single-item-single-piece type batch of tasks according to the determined order quantity and the second quantity threshold, such that the order quantity of each of the at least two single-item-single-piece batch of tasks is less than or equal to the second quantity threshold.

During goods picking, order items in one batch of task can be placed into one picking box, and distribution is not required, and the total quantity of orders contained in each batch of task is less than the second quantity threshold, thereby the number of picking times of each batch of task is reduced, in particular for order items with a small volume, the picking of orders in one batch can be completed through one picking operation, and the picked order items will be directly sent to a rechecking and packing station for rechecking and packing.

In step S1640, order item information of the single-item-single-piece type orders in the picking box is obtained one single-item-single-piece type order by one single-item-single-piece type order, packing materials are determined according to the order item information, and order item lists or express bills corresponding to the single-item-single-piece type orders are printed, so as to pack the order item lists or the express bills as well as the order items based on the selected packing materials.

In the case where the quantity of the order items in the picking box is determined and the outer package is not damaged, for different order items in the picking box, the order item information of the order item is obtained by scanning the bar codes on the order items one by one. According to the order item information of each order item, the packing material is determined and the corresponding order item list or express bill are printed, and then the packing material and the corresponding order item list or express bill are conveyed to a determined packing station for packing.

In the present embodiment, single-item-single-piece type orders including different order items are grouped into one batch for combining-picking, and the order items of the single-item-single-piece type orders are placed in one picking box during picking. As a result, the number of picking times of the order item in this batch is reduced, and the order item information of each order is obtained one by one at the rechecking and packing station. Accordingly, the corresponding packing material and the order item list or the express bill are determined, and conveyed to the determined packing station for packing, thereby improving the efficiency of picking, rechecking and packing and the efficiency of the entire warehouse operation process.

Embodiment Eleven

Figure 17:
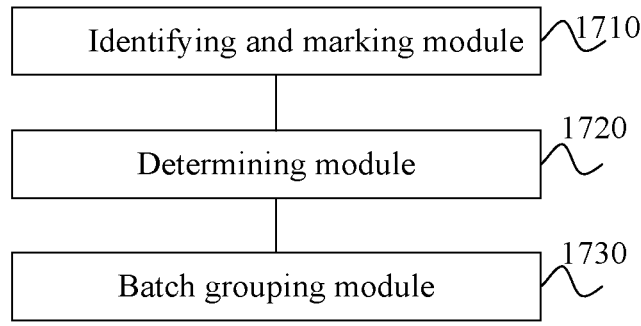
FIG. 17 is a structural view of another order processing device according to embodiments of the present disclosure.

FIG. 17 is a structural view of an order processing device provided in Embodiment Eleven of the present disclosure. As shown in FIG. 17, the device includes: an identifying and marking module 1710, a determining module 1720, and a batch grouping module 1730.

The identifying and marking module 1710 is configured to identify an order form according to order information, and mark at least one pending order according to the identified order form, where the order form includes a single-item-single-piece type.

The determining module 1720 is configured to determine the single-item-single-piece type orders in the order pool according to the mark of the order form.

A batch grouping module 1730 is configured to combine the single-item-single-piece type orders into at least one single-item-single-piece type batch of task for picking the single-item-single-piece type batch of task, where the single-item-single-piece type batch of task includes at least one single-item-single-piece type order.

In the present embodiment, the identifying and marking module 1710 identifies and marks the order form according to the order information, the determining module 1720 filters out the desired single-item-single-piece type order for batch grouping according to needs, and the batch grouping module 1730 groups the single-item-single-piece type orders determined by the determining module 1720 according to the batch grouping strategy, and the subsequent picking, rechecking and packing is performed according to the obtained at least one single-item-single-piece type batch of task. Therefore, the efficiency of the picking, rechecking and packing of single-item-single-piece type orders can be improved, and the efficiency of the entire warehouse operation process can be improved.

On the basis of one or more embodiments described above, the batch grouping module is further configured to:
combine orders with the same order item in the single-item-single-piece type orders into at least one single-item-single-piece type batch of task.

On the basis of one or more embodiments described above, the batch grouping module is further configured to:
determine orders with the same order item in the single-item-single-piece type orders;
combine the determined orders into one single-item-single-piece type batch of task if the quantity of the determined orders is less than or equal to a first preset threshold; and
if the quantity of the determined orders is greater than the first preset threshold, combine the determined orders into at least two single-item-single-piece type batch of tasks according to the quantity of the determined orders and the first preset threshold so that the order quantity of each of the at least two single-item-single-piece type batch of tasks is less than or equal to the first preset threshold.

On the basis of one or more embodiments described above, the module further includes: a first rechecking and packing module.

The first rechecking and packing module is configured to determine the order item information of the single-item-single-piece type orders in the picking box, and print the order item lists and/or the express bills for the single-item-single-piece type orders based on the order item information of the single-item-single-piece type orders, where the quantity of packed packing boxes is the same as the quantity of the single-item-single-piece type orders in the picking box. The order item list and/or the express bill are packed with the order item.

On the basis of one or more embodiments described above, the batch grouping module is further configured to:
combine orders, whose distribution addresses are directed to the same city, in the single-item-single-piece type orders into at least one single-item-single-piece type batch of task, where the single-item-single-piece type orders in each single-item-single-piece type batch of task include different order items.

On the basis of one or more embodiments described above, the batch grouping module is further configured to:
determine orders whose distribution addresses are directed to the same city in the single-item-single-piece type orders;
combine the determined orders into one single-item-single-piece type batch of task if the quantity of the determined orders is less than or equal to a second quantity threshold; and
if the quantity of the determined orders is greater than the second quantity threshold, combine the determined orders into at least two single-item-single-piece type batch of tasks according to the quantity of the determined orders and the second quantity threshold so that the order quantity of each of the at least two single-item-single-piece type batch of tasks is less than or equal to the second quantity threshold.

On the basis of one or more embodiments described above, the module further includes: a second rechecking and packing module.

The second rechecking and packing module is configured to obtain order item information of the single-item-single-piece type orders in the sorting box one by one, determine packing materials according to the order item information, and print order item lists or express bills corresponding to the single-item-single-piece type orders, so as to pack the order item lists or the express bills with the order items according to the selected packing materials.

The order processing device provided by embodiments of the present disclosure can execute the order processing methods provided by embodiments of the present disclosure, and has functional modules and effects corresponding to the execution of the methods.

Embodiment Twelve

A traditional logistics operation mode of a distribution center has the following characteristics of large human workload, low efficiency of human carrying and manual picking, high error rate, and inability of meeting the requirements of multi-category and small batch of E-commerce logistics. Therefore, it is urgent to adopt the key technologies of intelligent and automatic E-commerce logistics system to enhance the capability of E-commerce logistics business. With an order fulfillment center as an example, there is usually at least one platform for processing orders. The orders usually includes a forward order and a backward order. The forward order is generally the ordering order. For example, the user purchases several pieces of clothes on the E-commerce platform, and the system packs these pieces of clothes into a forward order. The backward order is generally the return order. For example, the user buys several pieces of clothes on the E-commerce platform, but needs to return them, and thus a return order is generated. The backward order needs to be disassembled and sorted on the platform, and the processing speed is low. Usually the platform will receive an order set containing both forward orders and backward orders. Because of the existence of backward orders and the low processing speed of the backward orders, the processing speed of the order set on the platform will be too low.

Figure 18:
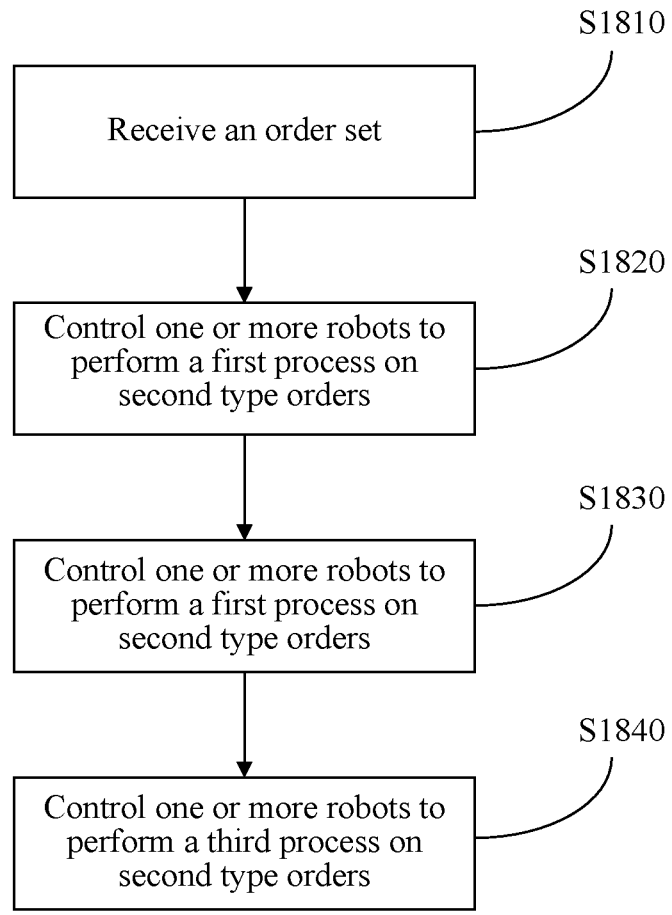
FIG. 18 is a flowchart of another order processing method according to embodiments of the present disclosure.

As shown in FIG. 18, embodiments of that present disclosure provide an order processing method, which runs in an order processing system (the order processing system can be a local server or a cloud server). The system may be an order processing system of an E-commerce platform or an order processing system for production and processing of an enterprise. The order processing system is configured as a fulfillment center or a warehouse, which is not limited herein. The method includes the following steps.

In step S1810, an order set is received.

In one embodiment, the order set includes at least one first type order and at least one second type order. Each of the first type order and the second type order includes one or more order items. The first type order is a forward order. Usually the normal order is a ordering order. For example, the user purchases several pieces of clothes on the E-commerce platform, and the system packs the clothes into a forward order. The backward order is a return order. For example, the user purchases several pieces of clothes on the E-commerce platform, but returns them, and thus a return order is generated.

In one embodiment, the order processing system receives an order set. Before the order set is received by the order processing system, another system classifies received orders, generates the order set, and sends the order set to the order system. Alternatively, the steps of orders reception and classification may be performed directly by the order processing system, which is not limited herein. The order is sent by the user through a terminal. The order may be sent through an application program (APP) on the terminal. Alternatively, the order may be sent through login to the e-commerce server with the browser in the terminal. Alternatively, the order can be sent directly through the telephone or the like. The order sending manner is not limited by the application.

In one embodiment, after receiving the order set (a plurality of pending orders), the system performs decomposition and analysis of the order set and obtains multiple forward orders and multiple backward orders. The system parses an identification of each order item in each order, and calculates a quantity of each order item in each order.

In step S1820, one or more robots are controlled to perform a first process on the second type order.

In one embodiment, embodiments of the present disclosure use a robot to carry order items, for example, the carrying robot is an automatic guided vehicle (AGV), which is an unmanned automatic carrying trolley equipped with a non-contact guide control device and powered by a battery. The carrying robot is an automatically guided vehicle, and has the following characteristics. The trolley can be controlled and embedded with a control program through an upper computer. The computer issues an instruction, and the unmanned driving is implemented under the supervision of the computer. The trolley automatically travels along a path planned by the upper computer, reaches a designated place, completes a series of tasks, and waits for the next instruction. The interior of the AGV includes vehicle-mounted control, path planning, computer control and principle, system simulation, wireless communication, navigation and positioning, information acquisition and processing, automatic charging and other technologies. The system can realize reasonable path planning, optimized path selection and real-time environment monitoring for a plurality of AGVs, avoid the collision of the plurality of AGVs, and ensure the coordinated operation of the plurality of AGVs.

In one embodiment, the system first controls the robot to perform a second process on the backward order. The second process is sending an inventory container corresponding to order items in the backward order to a temporary warehouse. The temporary warehouse is configured to store order items to be packed or to be subjected to the inbound operation.

In step S1830, one or more robots are controlled to perform the second process on the first type order.

In one embodiment, the system controls the robot to perform the second process on the first type order while or after the robot performs the second process on the backward order. The second process is carrying the order items in the first type order from the corresponding inventory container to a platform (or target workstation) for picking and packing.

In step S1840, one or more robots are controlled to perform a third process on the second type order.

In one embodiment, after the first type order is processed, the system controls one or more robots to perform a third process on the second type order. The third process is sending order items in the second type order into an inventory container in the temporary warehouse.

In one embodiment, each inventory container corresponds to an order item type, and has an inventory container identification (ID) and an order item type identification of the order item stored in the inventory container. The order item type identification and the inventory container ID are stored in an ID memory of the inventory container, and can be synchronized to a server through a communication module on the inventory container. The server can also modify the order item type identification and the inventory container ID through the communication module.

In one embodiment, the robot is in one-to-one correspondence with the inventory container. For example, there are 100 inventory containers in the warehouse, 100 robots are needed to correspond to the inventory containers. In the system, a correspondence table between the robots and the inventory containers is maintained. Each inventory container has an inventory container ID, and each robot has a robot ID, which are stored in the correspondence table. The advantage of the correspondence table is that the control of the robots is relatively simple, and each inventory container has a dedicated robot for its carrying service.

In one embodiment, the robot is in one-to-multi relationship with the inventory container. For example, the warehouse includes 100 inventory containers and 50 robots corresponding to the 100 inventory containers. Each robot serves two stationary inventory containers. The two inventory containers may store the same type of order item to improve the service efficiency of the robot.

In one embodiment, there is no correspondence between the robots and the inventory containers, and the robots are coordinately controlled by the system. One robot may serve multiple inventory containers at the same time, which has the advantage that all the robots can be fully mobilized, the use efficiency of the robots can be improved, and fewer robots are required.

In one embodiment, in order to increase efficiency, before the robot is controlled to perform the first process on the return order, the system determines whether the order items in the ordering order and the order items in the return order overlap. For example, if the ordering order includes an mug whose order item type identification is A001, and the return order also includes an mug whose order item type identification is A001, then the ordering order and the return order have the overlapping order item, and the robot is controlled to take the mug out of the return order and places it into a buffer container. The buffer container is located at the periphery of the platform. In the subsequent first processing, the inventory container corresponding to the mug does not need to be moved to the temporary warehouse. In the second processing, the robot is controlled to directly take out the mug from the buffer container at the periphery of the platform and pack the mug into the ordering order, thereby saving the steps of taking out the inventory container from the warehouse to the temporary warehouse and taking out the mug from the warehouse, and improving the efficiency in part.

In one embodiment, in order to increase efficiency, before the robot is controlled to perform a second process on the ordering order, the system determines whether the inventory container sent into the temporary warehouse in the first process and the corresponding inventory container in the second process overlap. If the inventory container sent into the temporary warehouse in the first process and the corresponding inventory container in the second process overlap, the second process is picking and packing the order item of the ordering order from the inventory container in the temporary warehouse. In one embodiment, after the first process, one or more inventory containers may be in the temporary warehouse. Before the robot is controlled to perform the second process on the ordering order, the system determines whether the inventory container required by the ordering order and the inventory container in the temporary warehouse overlap. For example, the ordering order includes a mug A001, and the inventory containers in the temporary warehouse also include an inventory container with an order item identification of A001. At this time, the robot is controlled to take out the mug from the inventory container in the temporary warehouse. In this way, the robot does not need to go to the warehouse to pick up the order item, thereby saving the robot's traveling path and time.

In one embodiment, in order to improve efficiency, the inventory container matched by the order item of the second type order is the inventory container matched by the order item and having a maximum empty space quantity. The inventory container matched by the order item of the first type order is the inventory container matched by the order item and having the minimum empty space quantity. The orders may have many common order items. Therefore, for the order items in the return order, the inventory container with as many empty spaces as possible is selected to avoid the repeated carryings due to insufficient empty spaces. For the ordering order, the inventory container with as few empty spaces as possible is selected to avoid repeated carryings due to insufficient order items. In one embodiment, the inventory container includes a counting module, which can automatically determine the number of order items by a fixed position detection or a weight detection. During determining with the fixed position, the inventory container is divided into fixed storage positions in advance, each storage position includes a weight sensor or a light sensor. The number of operating weight sensors or light sensors indicates how many order items are in the inventory container, and the number of weight sensors or light sensors which are not operating indicates how many empty spaces are in the inventory container. When there is no fixed buffer position, weight sensors can be used to estimate the quantity of order items. For products produced by the standardized production process, the weight of the single product is usually fixed, and may be preset in the system. When the weight sensors detect the total weight of order items in the buffer container, the quantity of the order items can be calculated, and the quantity of empty spaces can be calculated through the remaining load. The quantity of order items and the quantity of empty spaces are both stored in the ID memory of the inventory container, and the above information is synchronized with the server through the communication module, and the information is stored in the form of a table, an example of which is as follows:

| Inventory Container ID | Order Item Type | Quantity of order Items | Quantity of empty Spaces |
|---|---|---|---|
| SH001 | A001 | 30 | 20 |

The communication module may be wireless-fidelity (WIFI), fourth generation communications system (4G), bluetooth, radio frequency identification (RFID), or the like, and is not limited herein.

In one embodiment, the system determines whether there is an idle robot before performing robot controlling. In an example where the robots do not have correspondence with the inventory containers, if there is an idle robot, one or more idle robots are controlled to process the order. If there is no idle robot, a robot is selected according to a control strategy, and a processing instruction is sent to an instruction queue of the robot. In one embodiment, the system may control multiple robots at the same time. When performing robot controlling for order item carrying, the system first determines whether there is an idle robot. The idle robot may be a standby robot that is not performing carrying tasks, or a robot that has completed all carrying tasks and returning. If there is an idle robot, the idle robot is controlled to carry out corresponding processing operation. If there is no idle robot, according to the preset control strategy, a robot is selected and a carrying instruction is sent to the robot's instruction queue. In one embodiment, each time the robot completes a state change, the robot feeds back its state to the control system, which maintains a robot state table:

| Robot ID | State Code |
|---|---|
| ROB01 | 000 |
| ROB02 | 001 |
| ROB03 | 011 |

Each robot has a robot ID. The robot IDs are used for identifying different robots. State 000 denotes an idle state, state 001 denotes a carrying state, and state 011 denotes that all carrying tasks are completed and the robot is returning. When robots with state code 000 or state code 011 exist, a carrying instruction may be sent to the robots directly. The robot with state code 000 is preferentially controlled, followed by the robot with state code 011. If all the robots are with state code 001, a robot that meets a standard may be selected according to the preset control strategy, and the carrying instruction may be sent to the instruction queue of the robot. In one embodiment, the preset control strategy may be selecting a robot randomly, or selecting a robot nearest the corresponding inventory container, or selecting a robot with minimal carrying tasks, etc., which is not limited herein. Multiple strategies may preset, different control strategies are used according to different time or order quantities.

Embodiments of the present disclosure can automatically arrange the order processing sequence according to the forward orders and backward orders in the order set, process the forward orders preferentially, finish the preparation work of the backward order processing, and then process the backward orders, thereby optimizing the order processing flow, and improving the order processing efficiency.

Embodiment Thirteen

Figure 19:
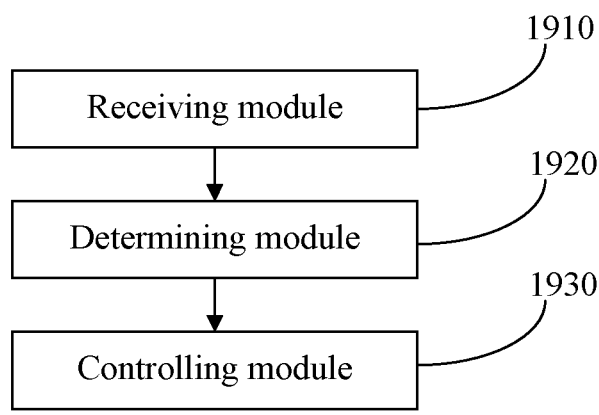
FIG. 19 is a structural view of another order processing device according to embodiments of the present disclosure.

Referring to FIG. 19, embodiments of the present disclosure provide an order processing device. The order processing device includes: a receiving module 1910, a determining module 1920, and a controlling module 1930.

The receiving module 1910 is configured to receive an order set including at least one first type order and at least one second type order, where each of the first type order and the second type order includes one or more order items.

The determining module 1920 is configured to: determine whether order items in the first type order and order items in the second type order overlap, control one or more robots to take out an overlapping order item in the second type order and place the overlapping order item in a buffer container in response to a determination result that the order items in the first type order and the order items in the second type order overlap.

The controlling module 1930 is configured to control one or more robots to pick and pack order items of the first type order from the buffer container.

In one embodiment, the device further includes: a first control module, a second control module, and a third control module.

The first control module is configured to control one or more robots to perform a first process on the second type order, where the first process includes sending an inventory container corresponding to order items in the second type order to a temporary warehouse.

The second control module is configured to control one or more robots to perform a second process on the first type order. The second process includes picking and packing order items of the first type order from a matching inventory container. Whether the inventory container sent to the temporary warehouse in the first process and the matching inventory container in the second process overlap is determined. In response to a determination result that the inventory container sent to the temporary warehouse in the first process and the matching inventory container in the second process overlap, the second process is picking and packing order items of the first type order from the inventory container in the temporary warehouse. In response to a determination result that the inventory container sent to a temporary warehouse in the first process and the matching inventory container in the second process do not overlap, the second process is picking and packing order items of the first type order from the matching inventory container.

The third control module is configured to control one or more robots to perform a third process on the second type order, where the third process includes sending order items in the second type order to an inventory container in the temporary warehouse.

Implementation of the control process is the same as that in steps S1810 to S1840, which will not be described herein.

In one embodiment, in the order processing device of the present embodiment, the first type order is an ordering order and the second type order is a return order.

In one embodiment, in the embodiment, the first process is sending an inventory container corresponding to order items in the second type order to the temporary warehouse; the second process is picking and packing the order items in the first type order from the corresponding inventory container; and the third process is sending the order items in the second type order into the inventory container in the temporary warehouse.

In one embodiment, the order processing device is further configured to determine whether or not production of order items in orders is completed, and if production of order items is completed, control a robot to place the order items into an order inventory container.

In one embodiment, in the embodiment, the first process and the second process are performed simultaneously.

In one embodiment, in the embodiment, the robot is in one-to-one correspondence with the inventory container.

In one embodiment, in the embodiment, the order processing device further includes a first determining and controlling module. The first determining and controlling module is configured to: determine whether order items in the ordering order and order items in the return order overlap before the first processing, and if the order items in the ordering order and order items in the return order overlap, control one or more robots to take out the overlapping order item in the return order and place the overlapping order item in the buffer container.

In one embodiment, in the embodiment, order items in the first type order are sorted and packed from the buffer container when the second process is performed.

In one embodiment, the order processing device further includes: a second determining and controlling module. The second determining and controlling module is configured to: determine whether there is an idle robot before each robot controlling, and if there is an idle robot, control one or more idle robots to process orders; if there is no idle robot, select a robot according to the control strategy, and send a processing instruction to an instruction queue of the robot.

In one embodiment, the device for processing order further includes: a second determining module. The second determining module is configured to determine whether the inventory container sent into the temporary warehouse in the first process and the corresponding inventory container in the second process overlap. If the inventory container sent into the temporary warehouse in the first process and the corresponding inventory container in the second process overlap, the second process is picking and packing order items in the first type order from the inventory container in the temporary warehouse.

In one embodiment, the inventory container matching order items in the second type order is the inventory container with the maximum number of empty spaces matching the order items in the second type order. The inventory container matching the order items in the first type order is the inventory container with the minimum number of empty spaces matching the order items in the first type order.

Implement of the steps executed by the order processing device is the same as that in steps S1810 to S1840, which will not be described herein.

Embodiment Fourteen

Figure 20:
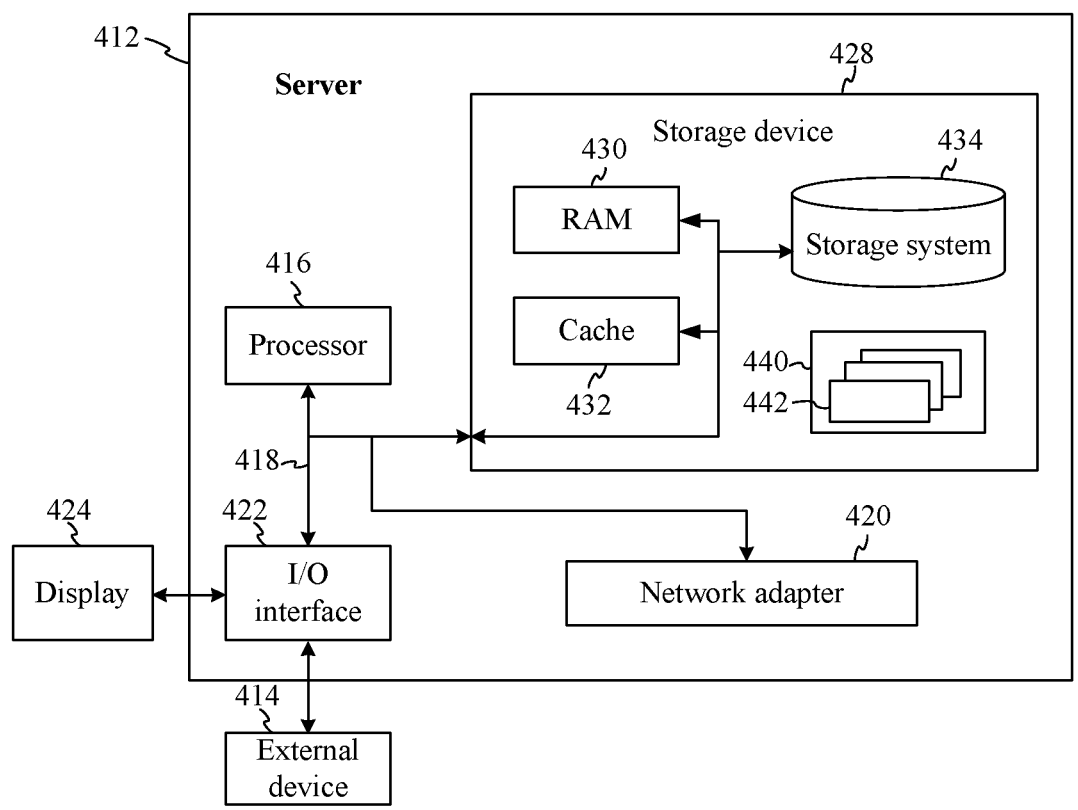
FIG. 20 is a structural view of a server according to embodiments of the present disclosure.

FIG. 20 is a structural view of a server according to Embodiment Fourteen of the present disclosure. FIG. 20 shows a block diagram of an exemplary server 412 suitable for implementing embodiments of the present disclosure. The server 412 shown in FIG. 20 is merely an example and is not intended to impose any limitation on the functionality and scope of embodiments of the present disclosure.

As shown in FIG. 20, the server 412 is represented in the form of a general server. Components of server 412 may include, but not limited to, one or more processors 416, a storage device 428, and a bus 418 connecting different system components (including storage device 428 and processors 416).

The bus 418 represents one or more of several types of bus structures, including a storage device bus or storage device controller, a peripheral bus, a graphics acceleration port, a processor, or a local bus using any of a plurality of bus structures. For example, these structures include, but are not limited to, an industry subversive alliance (ISA) bus, a micro channel architecture (MAC) bus, an enhanced ISA bus, a video electronics standards association (VESA) local bus, and a peripheral component interconnect (PCI) bus.

The server 412 includes a plurality of computer system readable media. These media can be any available medium that can be accessed by the server 412, including volatile medium and non-volatile medium, removable medium and non-removable medium.

The storage device 428 may include a computer system readable medium in the form of volatile memory, such as random access memory (RAM) 430 and/or cache memory 432. The server 412 may further include other removable/non-removable, volatile/non-volatile computer system storage medium. By way of example only, the storage system 434 may be configured to read and write non-removable, non-volatile magnetic medium (not shown in FIG. 20, commonly referred to as a "hard disk drive"). Although not shown in FIG. 20, a magnetic disk drive for reading and writing a removable non-volatile disk (e.g., "floppy disk") and an optical disk drive for reading and writing a removable non-volatile disk, such as a compact disc read-only memory (CD-ROM), a digital video disc-read only memory (DVD-ROM), or other optical medium may be provided. In these cases, each drive may be connected to the bus 418 via one or more data medium interfaces. The storage device 428 may include at least one program product having a set (e.g., at least one) of program modules configured to perform functions of one or more embodiments of the present disclosure.

A program/utility 440 with a set (at least one) of program modules 442, including, but not limited to, an operating system, one or more applications, other program modules, and program data, may be stored, for example, in a storage device 428. Each or some combination of the embodiments may include an implementation of a network environment. The program module 442 generally performs functions and/or methods in embodiments of the present disclosure.

Server 412 may also communicate with one or more external devices 414 (e.g., keyboard, pointing terminal, display 424, and the like). The server 412 also can communicate with one or more terminals that enable a user to interact with the server 412, and/or with any terminal (e.g., a network card, modem, and the like) that enables the server 412 to communicate with one or more other computing terminals. This communication may be performed through an input/output (I/O) interface 422. Further, the server 412 may also communicate with one or more networks, such as a local area network (LAN), a wide area network (WAN), and/or a public network, such as the Internet, through a network adapter 420. As shown in FIG. 20, the network adapter 420 communicates with other modules of server 412 through bus 418. It should be noted that, although not shown, other hardware and/or software modules may be used in conjunction with server 412, including, but not limited to, microcode, terminal drives, redundant processors, external disk drive arrays, redundant arrays of independent disks (RAID) systems, tape drives, data backup storage systems, and the like.

Processor 416 implements the methods described in any embodiment of the present disclosure by executing programs stored in storage device 428 to perform one or more functional applications and data processing.

In addition, embodiments of the present disclosure provide an electronic device including:

at least one processor; and a memory which is in a communication connection with the at least one processor.

The memory stores instructions executable by the at least one processor. Execution of the instructions by the at least one processor causes the at least one processor to execute the order processing method in the embodiments or implementations described above.

Figure 21:
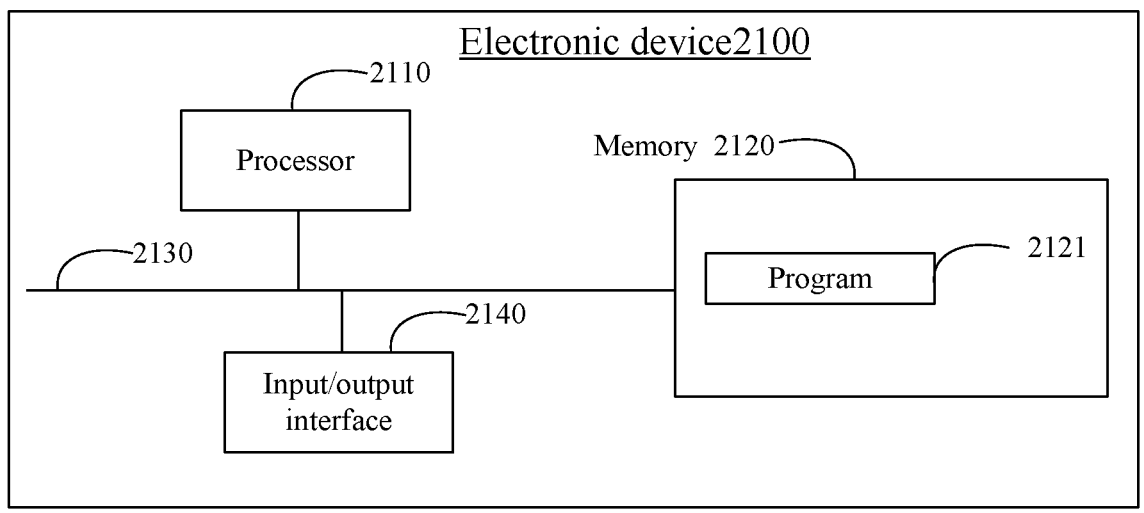
FIG. 21 is a structural view of an electronic device according to embodiments of the present disclosure.

Referring to FIG. 21, a structural view of an electronic device 2100 according to embodiments of the present disclosure is shown. The electronic device 2100 includes at least one processor 2110 (e.g., a central processing unit (CPU)), at least one input/output interface 2140, a memory 2120, and at least one communication bus 2130, configured to implement communication connection between these components. At least one processor 2110 is configured to execute an executable module, such as a computer program, stored in memory 2120. The memory 2120 is a non-transitory memory, which may include volatile memory, such as a high-speed random access memory (RAM), or non-volatile memory, such as at least one disk memory. Communication connection with at least one other network element is achieved through at least one input/output interface 2140 (which may be a wired or wireless communication interface).

In some embodiments, the memory 2120 stores a program 2121, and the processor 2130 executes the program 2121 and is configured to perform the methods of any of the embodiments described above.

There is any such actual relationship or order between entities or operations. Further, the term "comprising", "including" or any other variant thereof is intended to encompass a non-exclusive inclusion so that a process, method, order item or device that includes a series of elements not only includes the expressly listed elements but may also include other elements that are not expressly listed or are inherent to such process, method, order item or device. In the absence of more restrictions, the elements defined by the statement "including a . . . " do not exclude the presence of additional identical elements in the process, method, order item or device that includes the elements.

One or a plurality of embodiments in the specification are described in a relevant manner. The same or similar parts in the embodiments can be referred to by each other. Each embodiment focuses on differences from other embodiments.

As for the device embodiments, since it is substantially similar to the method embodiments, the description is relatively simple, and reference may be made, where relevant, to the partial description of the method embodiments.

Logic and/or steps represented in a flowchart or otherwise described herein, for example, may be considered a sequential table of executable instructions for implementing logical functions, and may be implemented in any computer-readable medium for use by, or in conjunction with, an instruction execution system, device, or facility, such as a computer-based system, a system including a processor, or other system that may fetch and execute instructions from the instruction execution system, device, or facility. "Computer-readable medium" for the specification may be any device that may contain, store, communicate, propagate, or transmit program for use by or in conjunction with an instruction execution system, device, or facility. Further, the computer-readable medium may even be a paper or other suitable medium on which the program may be printed, so that that program can be obtain electronically, for example, by optical scanning of a pap or other medium, followed by editing, interpreting, or other suitable process as necessary, and then stored in computer memory.

It should be noted that each part of the present disclosure may be implemented by hardware, software, firmware or a combination thereof.

In the above-mentioned embodiments, a plurality of steps or methods may be implemented by software or firmware stored in a memory and executed by a suitable instruction execution system. For example, if hardware is used for implementation, as in another embodiment, any one or a combination of the following technologies well known in the art can be used for implementation: discrete logic circuits having logic gate circuits used for implementing logic functions on data signals, application-specific integrated circuits having suitable combinational logic gates, programmable gate arrays (PGAs), field programmable gate arrays (FPGAs), etc.

Embodiment Fifteen

Embodiment Fifteen in the present disclosure further provides a computer-readable storage medium configured to store computer programs for executing the methods in any of embodiments in the present disclosure when executed by a processor.

The computer storage medium of embodiments of the present disclosure may employ any combination of one or more computer readable media. The computer-readable medium may be a computer-readable signal medium or a computer-readable storage medium. Computer-readable storage medium may be, for example, but not limited to, systems, devices, or components of electrical, magnetic, optical, electromagnetic, infrared, or semiconductor, or any combination thereof. Computer-readable storage medium includes (non-exhaustive list): an electrical connection having one or more wires, a portable computer disk, a hard disk, a random access memory (RAM), a read only memory (ROM), an erasable programmable read only memory (EPROM) or flash memory, an optical fiber, a portable compact disk read only memory (CD-ROM), an optical memory, a magnetic memory, or any suitable combination thereof. In the document, a computer-readable storage medium may be any tangible medium containing or storing a program that may be used by or in conjunction with an instruction execution system, device, or component.

The computer-readable signal medium may include a data signal propagating in baseband or as part of a shipper batch carrying computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that may send, propagate, or transmit programs for use by or in conjunction with an instruction execution system, device, or component.

The program code contained on the computer-readable medium may be transmitted on any suitable medium, including, but not limited to, wireless, wire, optical cable, radio frequency (RF), and the like, or any suitable combination thereof.

Computer program code for performing the operations of the present disclosure may be written in one or more programming languages or combination thereof, including object-oriented programming languages such as Java, Smalltalk, C++, as well as conventional procedural programming languages such as "C" or similar programming languages. The program code may be executed entirely on the user's computer, partially on the user's computer, as a separate software package, partially on the user's computer, partially on the remote computer, or entirely on the remote computer or terminal. In the case of a remote computer, the remote computer may be connected to a user computer through any kind of network, including a LAN or WAN, or may be connected to an external computer (e.g., via the Internet using an Internet service provider).

What is claimed is:

1. An order processing method, the method being executed by a processor and comprising:
    the processor receiving at least one pending order and placing the at least one pending order in an order pool;
    the processor dividing part or all of pending orders in the order pool into at least one batch of tasks;
    for any of the at least one batch of tasks, the processor allocating the batch of tasks to a corresponding target workstation, selecting a target inventory container matching an order item for a pending order in the batch of tasks, and selecting a target robot for carrying the target inventory container for the batch of tasks; and
    the processor controlling the target robot to carry the target inventory container matching the order item to a target workstation corresponding to the batch of tasks,
    wherein the processor dividing the part or all of pending orders in the order pool into the at least one batch of tasks, comprises:
    combining and classifying part or all of pending orders in the order pool according to different dimensions to obtain the at least one batch of tasks; or, based at least in part on an order item overlapping degree of part or all of pending orders in the order pool, combining part or all of the pending orders into at least one order group in a combining manner, each of the at least one order group being one batch of tasks.

2. The method of claim 1, wherein the allocating the batch of tasks to a corresponding target workstation, and selecting a target inventory container matching an order item for a pending order in the batch of tasks comprises:
    according to a parameter of the order item of the pending order in the batch of tasks, allocating the batch of tasks to the corresponding target workstation, and selecting the corresponding target inventory container matching the order item for the pending order in the batch of tasks.

3. The method of claim 2, wherein the selecting a target robot for carrying the target inventory container for the batch of tasks comprises:
    scheduling the target robot based at least in part on position information of the target workstation to control the target robot to carry the target inventory container matching the order item to the target workstation.

4. The method of claim 3, wherein the scheduling the target robot based at least in part on position information of the target workstation to control the target robot to carry the target inventory container matching the order item to the target workstation comprises:

finding a target robot whose navigation distance does not exceed a distance threshold based at least in part on the position information of the target workstation; and sending a scheduling instruction to the found target robot, wherein the scheduling instruction is used for instructing the found target robot to carry the target inventory container matching the order item to the target workstation;

wherein the navigation distance is a moving distance of the target robot, the target robot starting from a current position and carrying the target inventory container matching the order item to the target workstation.

5. The method of claim 2, wherein the allocating the batch of tasks to a corresponding target workstation according to the parameter of the order item of the pending order in the batch of tasks comprises:

according to parameters of order items of pending orders in the batch of tasks, determining an overlapping order item among the order items; and according to a quantity of inventory containers comprising the overlapping order item, allocating the batch of tasks to the corresponding target workstation, wherein in the target workstation, the quantity of inventory containers comprising the overlapping order item exceeds a first threshold.

6. The method of claim 2, wherein the selecting a target inventory container matching the order item for the pending order in the batch of tasks according to the parameter of the order item of the pending order in the batch of tasks comprises:

according to the parameter of the order item of the pending order in the batch of tasks, selecting a target inventory container matching the order item of the pending order in the batch of tasks, according to a first-expiration-first-out principle associated with a production date of an order item of the inventory container and a first-in-first-out principle associated with inbound time of the order item of the inventory container.

7. The method of claim 2, wherein the selecting a target inventory container matching the order item of the pending order in the batch of tasks according to the parameter of the order item of the pending order in the batch of tasks comprises:

according to parameters of order items of the pending order in the batch of tasks, sequentially selecting a corresponding inventory container pool matching the target workstation, and the target inventory container other than the inventory container pool in an inventory container area, wherein a quantity of order items of the pending orders in the batch of tasks comprised in the target inventory container exceeds a second threshold.

8. The method of claim 1, wherein the dimensions comprise at least one of: an owner, a warehouse area, an outbound type, a shipper, cut-off time, or order priority.

9. The method of claim 1, wherein selecting a target inventory container matching an order item for a pending order in the batch of tasks comprises:

obtaining a plurality of selectable inventory container combinations based at least in part on an inventory container selection rule and algorithm; and taking an inventory container included in one of the plurality of inventory container combinations with a minimum quantity as the target inventory container.

10. The method of claim 1, wherein based at least in part on an order item overlapping degree of part or all of pending orders in the order pool, combining part or all of the pending orders into at least one order group in a combining manner comprising:

determining an order quantity of pending orders of the order group based at least in part on a quantity of cells of the sorting wall; and combining pending orders, the order item overlapping degree being greater than or equal to a first overlapping degree threshold and a quantity being less than or equal to the order quantity, into an order group.

11. The method of claim 10, wherein before combining pending orders, the order item overlapping degree being greater than or equal to a first overlapping degree threshold and a quantity being less than or equal to the order quantity, into an order group, the method further comprises:

based at least in part on priorities and creation time of the pending orders, the processor performing preliminary filtering on the pending orders according to a preset filtering rule;

wherein the combining pending orders, the order item overlapping degree being greater than or equal to a first overlapping degree threshold and a quantity being less than or equal to the order quantity, into an order group comprising:

combining the filtered pending orders, the order item overlapping degree being greater than or equal to a first overlapping degree threshold and a quantity being less than or equal to the order quantity, into an order group.

12. The method of claim 1, wherein the target robot is a first target robot, and the method further comprises:

in response to a trigger condition of the batch of tasks allocation, the processor controlling the first target robot to park the target inventory container in the target workstation, and determining a target order to be allocated to the target workstation in next time based at least in part on an item overlapping degree or order overlapping degree between pending target orders in the order pool and the batch of tasks, wherein the target orders comprise at least one of pending order groups or pending orders in the order pool.

13. The method of claim 12, wherein determining the target order to be allocated to the target workstation for the next time based at least in part on the item overlapping degree between the batch of tasks and pending target orders in the order pool comprises:

comparing remaining inventory items in the inventory container of the target workstation and inventory items in the target inventory container that is being moved with order items in pending target orders in the order pool, and taking target orders whose order item overlapping degree is greater than a second overlapping degree threshold as the target orders to be allocated to the target workstation for the next time.

14. The method of claim 12, wherein determining target orders to be allocated to the target workstation for the next time based at least in part on the item overlapping degree between the batch of tasks and pending target orders in the order pool comprises:

comparing remaining inventory items in an inventory container of the target workstation and inventory items in the target inventory container that is being moved with order items in pending target orders in the order pool, and taking target orders whose order item overlapping degree is greater than a third overlapping degree threshold as the target order to be allocated to the target workstation for the next time.

15. The method of claim 12, wherein after determining target order to be allocated to the target workstation for the next time based at least in part on the item overlapping degree between the batch of tasks and pending target orders in the order pool, the method further comprises:
if not all of order items of the target order to be allocated to the target workstation for the next time are contained in remaining inventory items in an inventory container of the target workstation and inventory items in the target inventory container that is being moved, the processor determining an inventory container in which the uncontained order item is located, and controlling a second target robot to carry the inventory container in which the order item not contained by the inventory container is located to the target workstation.

16. The method of claim 1, wherein selecting a target inventory container matching an order item for a pending order in the batch of tasks comprises: determining the target inventory container based at least in part on target order information, inventory information, and an inventory container selection strategy;
wherein selecting a target robot for carrying the target inventory container for the batch of tasks comprising:
determining the target robot according to the target inventory container and an optimal path of the robot to reach the target inventory container.

17. The method of claim 1, after the at least one pending order is placed into an order pool, further comprising:
the processor identifying an order form according to order information, and marking the at least one pending order according to the identified order form, wherein the order form comprises a single-item-single-piece type.

18. The method of claim 17, wherein dividing part or all of pending orders in the order pool into at least one batch of tasks, comprises:
according to a mark of the order form, determining single-item-single-piece type orders in the order pool; and
combining the single-item-single-piece type orders into at least one single-item-single-piece type batch of tasks for picking the at least one single-item-single-piece type batch of tasks, wherein each of the at least one single-item-single-piece type batch of tasks comprises at least one single-item-single-piece type order.

19. The method of claim 18, wherein the combining the single-item-single-piece type orders into at least one single-item-single-piece type batch of tasks comprises:
combining orders having a same order item among the single-item-single-piece type orders into at least one single-item-single-piece type batch of tasks.

20. The method of claim 19, wherein the combining orders having a same order item among the single-item-single-piece type orders into at least one single-item-single-piece type batch of tasks, comprises:
determining orders having a same order item among the single-item-single-piece type orders;
in response to a quantity of the determined orders being less than or equal to a first quantity threshold, combining the determined orders into one single-item-single-piece type batch of tasks; and
in response to the quantity of the determined orders being greater than the first quantity threshold, combining the determined orders into at least two single-item-single-piece type batch of tasks according to the quantity of determined orders and the first quantity threshold, so that a quantity of orders in each of the at least two single-item-single-piece type batch of tasks is less than or equal to the first quantity threshold.

21. The method of claim 18, wherein the combining the single-item-single-piece type orders into at least one single-item-single-piece type batch of tasks comprises:
combining orders whose shipping addresses are a same city among the single-item-single-piece type orders into at least one single-item-single-piece type batch of tasks, wherein single-item-single-piece type orders in each single-item-single-piece type batch of tasks include different order items.

22. The method of claim 21, wherein combining orders whose shipping addresses are a same city among the single-item-single-piece type orders into at least one single-item-single-piece type batch of tasks comprises:
determining orders whose shipping address are a same city in the single-item-single-piece type orders;
in response to the quantity of the determined orders being less than or equal to a second quantity threshold, combining the determined orders into one single-item-single-piece type batch of task; and
in response to the quantity of the determined orders is greater than the second quantity threshold, combining the determined orders into at least two single-item-single-piece type batch of tasks according to the quantity of the determined orders and the second quantity threshold, so that a quantity of orders in each of the at least two single-item-single-piece type batch of tasks is less than or equal to the second quantity threshold.

23. An order processing method, the method being executed by a processor and comprising:
the processor receiving an order set comprising at least one first type order and at least one second type order, wherein each of the first type order and the second type order comprises one or more order items;
the processor determining whether the order items in the first type order and the order items in the second type order overlap, controlling one or more robots to take out an overlapping order item from the second type order and place the overlapping order item in a buffer container in response to determining that the order items in the first type order and the order items in the second type order overlap; and
the processor controlling one or more robots to pick and pack the order items in the first type order from the buffer container,
the processor controlling one or more robots to perform a first process on the second type order, wherein the first process comprises sending an inventory container corresponding to an order item in the second type order to a temporary warehouse;
the processor controlling one or more robots to perform a second process on the first type order, wherein the second process comprises picking and packing order items of the first type order from a matching inventory container; determining whether the inventory container sent to the temporary warehouse in the first process overlaps the matching inventory container in the second process; in response to determining that the inventory container sent to the temporary warehouse in the first process overlaps the matching inventory container in the second process, the second process is picking and packing order items in the first type order from the inventory container in the temporary warehouse; and in response to determining that the inventory container sent to the temporary warehouse in the first process does not overlap the matching inventory container in the second process, the second process is picking and packing order items in the first type order from the matching inventory container; and the processor controlling one or more robots to perform a third process on the second type order, wherein the third process comprises sending order items in the second type order to the inventory container in the temporary warehouse.

24. A server, comprising:

one or more processors; and a memory, configured to store one or more programs, when executed by the one or more processors, the one or more programs cause the one or more processors to implement:

receiving at least one pending order and placing the at least one pending order in an order pool;

dividing part or all of pending orders in the order pool into at least one batch of tasks;

for any of the at least one batch of tasks, allocating the batch of tasks to a corresponding target workstation, selecting a target inventory container matching an order item for a pending order in the batch of task, and selecting a target robot for carrying the target inventory container for the batch of tasks; and controlling the target robot to carry the target inventory container matching the order item to a target workstation corresponding to the batch of tasks, wherein dividing the part or all of pending orders in the order pool into the at least one batch of task, comprises:

combining and classifying part or all of pending orders in the order pool according to different dimensions to obtain the at least one batch of tasks; or, based at least in part on an order item overlapping degree of part or all of pending orders in the order pool, combining part or all of the pending orders into at least one order group in a combining manner, each of the at least one order group being one batch of tasks.

25. A non-transitory computer-readable storage medium, configured to store computer instructions to implement the following steps when the computer instructions are executed by a processor:

receiving at least one pending order and placing the at least one pending order in an order pool;

dividing part or all of pending orders in the order pool into at least one batch of tasks;

for any of the at least one batch of tasks, allocating the batch of tasks to a corresponding target workstation, selecting a target inventory container matching an order item for a pending order in the batch of tasks, and selecting a target robot for carrying the target inventory container for the batch of tasks; and controlling the target robot to carry the target inventory container matching the order item to a target workstation corresponding to the batch of tasks, wherein dividing the part or all of pending orders in the order pool into the at least one batch of tasks, comprises:

combining and classifying part or all of pending orders in the order pool according to different dimensions to obtain the at least one batch of tasks; or, based at least in part on an order item overlapping degree of part or all of pending orders in the order pool, combining part or all of the pending orders into at least one order group in a combining manner, each of the at least one order group being one batch of tasks.

* * * * *